United States Patent
Berntorp et al.

(10) Patent No.: US 12,366,450 B2
(45) Date of Patent: Jul. 22, 2025

(54) SYSTEM AND METHOD FOR CONTROLLING A VEHICLE IN AN ENVIRONMENT

(71) Applicant: Mitsubishi Electric Research Laboratories, Inc., Cambridge, MA (US)

(72) Inventors: Karl Berntorp, Cambridge, MA (US); Marcel Menner, Belmont, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 57 days.

(21) Appl. No.: 18/213,572

(22) Filed: Jun. 23, 2023

(65) Prior Publication Data

US 2024/0426611 A1    Dec. 26, 2024

(51) Int. Cl.
*G01C 21/08* (2006.01)
*B60W 50/00* (2006.01)

(52) U.S. Cl.
CPC ......... *G01C 21/08* (2013.01); *B60W 50/0097* (2013.01); *B60W 2050/0026* (2013.01); *B60W 2050/0052* (2013.01); *B60W 2420/50* (2013.01)

(58) Field of Classification Search
None
See application file for complete search history.

(56) References Cited

U.S. PATENT DOCUMENTS

| | | | |
|---|---|---|---|
| 2021/0095967 A1* | 4/2021 | Karon | H04W 4/021 |
| 2022/0155079 A1* | 5/2022 | Chidlovskii | G06F 18/2148 |
| 2022/0187793 A1* | 6/2022 | Berntorp | G05B 13/048 |
| 2022/0404151 A1* | 12/2022 | Toutov | G01C 21/3807 |
| 2023/0243654 A1* | 8/2023 | Willis | G01C 21/16 |
| | | | 701/500 |

FOREIGN PATENT DOCUMENTS

| | | | |
|---|---|---|---|
| CN | 115540868 A | * | 12/2022 |
| WO | WO-2023185687 A1 | * | 10/2023 |

OTHER PUBLICATIONS

CN 115540868 A english translation, retrieved from Espacenet on Nov. 16, 202 (Year: 2024).*

* cited by examiner

*Primary Examiner* — Amelia Vorce
(74) *Attorney, Agent, or Firm* — Gene Vinokur

(57) ABSTRACT

The present disclosure discloses a system and a method for controlling a vehicle in an environment. The method uses a processor coupled to a memory storing a probabilistic map of the environment relating measurements of a magnetic field and time of the measurements of the magnetic field to a probability of locations within the environment. The processor is coupled with stored instructions when executed by the processor carry out steps of the method comprising estimating a probability of the current location in the environment based on a current measurement of a magnetometer at a current timestamp by submitting the current measurement and the current timestamp to the probabilistic map, and controlling an actuator of the vehicle based on a stochastic control employing the probability of the current location.

21 Claims, 25 Drawing Sheets

Algorithm 1 Automatic Tuning for NMPC Tracking Cost using higher order Moments from Probabilistic Motion Planner.

Input: Reference $\{y_k^{\text{ref}}\}_{k=0,\ldots}$ and covariance matrices $\{P_k\}_{k=0,\ldots}$. — 1140

1: while true do ▷ Control loop
2:    if new reference motion plan then — 1141
3:       Reset trajectories: $\{y_k^{\text{ref}}\}_{k=0,\ldots}$ — 1142 and $\{P_k\}_{k=0,\ldots}$. — 1143
4:       Smooth approximation $y^{\text{ref}}(\cdot)$ of reference motion.
5:    for $k = 0, \ldots, N$ do
6:       Automatic tuning: compute $W_k$ using covariance $P_k$. — 1130
7:    Wait for next step after sampling time $T_s$. — 1144
8: end while

FIG. 11C

SYSTEM AND METHOD FOR CONTROLLING A VEHICLE IN AN ENVIRONMENT

TECHNICAL FIELD

The present disclosure relates generally to control systems, and more particularly to a system and a method for controlling a vehicle in an environment using a probabilistic map.

BACKGROUND

Various control systems are used to control motion of a vehicle in an environment. The vehicle may be a drone, a mobile robot, an autonomous car, or any other aerial or wheeled robot. The environment may be an indoor environment, such as an indoor space of a building parking space, an indoor space a factory, an indoor space of a warehouse, and the like. Some approaches use magnetic field of the environment for localization and controlling of the vehicle in the environment.

Magnetic materials present in the environment cause anomalies in the magnetic field. The anomalies are dominated by spatial variations, although temporal variations exist, for example, in vicinity of mobile magnetic structures, such as elevators. As the spatial variations dominate over the temporal variations, the magnetic field is used in simultaneous localization and mapping (SLAM) settings for localization and controlling of the vehicle. Relying on the magnetic field for localization is advantageous for several reasons. First, the magnetic field can be measured by a magnetometer that is present in any inertial measurement unit (IMU). Second, the localization of the vehicle using the magnetic field does not need to rely on additional infrastructure or line-of-sight measurements.

However, using the magnetic field for the localization and the controlling of the vehicle is challenging. For example, magnetometer measurements of the magnetic field are noisy. In addition, the magnetic field in the environment varies with respect to time and space. In other words, time-varying uncertainty is associated with the magnetic field. As a result, the localization and the controlling of the vehicle is degraded. Therefore, there is a need for an improved system and a method for the localization and the controlling of the vehicle using the magnetic field.

SUMMARY

It is an object of some embodiments to provide a system a method for localization and controlling of a vehicle in an environment, using a magnetic field of the environment. Specifically, it is an object of some embodiments to determine a probabilistic map of the environment, and estimate a probability of the current location in the environment based on the probabilistic map. The probabilistic map of the environment relates measurements of the magnetic field and time of the measurements of the magnetic field to a probability of locations within the environment. Additionally, it is an object of some embodiments to control the vehicle in the environment based on the probability of the current location.

The present disclosure discloses a vehicle that includes an actuator, a magnetometer, a memory, a clock, a processor, and a stochastic control. The actuator is configured to change a current location of the vehicle in the environment. The magnetometer is configured to measure a magnetic field based on the current location of the vehicle. Some embodiments employ a 9-axis IMU that includes a magnetometer that measures the magnetic field in three spatial dimensions. Other embodiments use a standalone magnetometer. The clock is configured to timestamp the measurements of the magnetometer.

The memory is configured to store a probabilistic map of the environment. The probabilistic map relates measurements of the magnetic field and time of the measurements of the magnetic field to a probability of locations within the environment. Including time into the probabilistic map is beneficial, because although the magnetic field is spatially dominated, there is a time varying component that may lead to erroneous estimations of the vehicle location if the time varying component is not taken into account. The processor is configured to estimate a probability of the current location of the vehicle in the environment using the probabilistic map. For example, the processor is configured to obtain a current measurement of the magnetometer at a current timestamp. Further, the processor is configured to submit the current measurement and the current timestamp to the probabilistic map to estimate the probability of the current location of the vehicle.

Further, the processor is configured to control the actuator based on a stochastic control that employs the estimated probability of the current location. To perform the stochastic control, the processor is configured to execute a nonlinear stochastic model-predictive controller (SMPC) to produce a control command and submit the control command to the actuator. The control command may include values of one or combination of a steering angle of wheels of the vehicle and a rotational velocity of the wheels.

In some embodiments, the probabilistic map is a map of the magnetic field that probabilistically relates the measurements of the magnetic field to locations where the measurements of the magnetic field measurements are taken. Treating the map as probabilistic is beneficial because magnetometer measurements are inherently noisy, and the exact location of the magnetometer corresponding to a particular magnetic field measurement is uncertain. For example, some embodiments determine the probabilistic map using simultaneous localization and mapping (SLAM) of the vehicle location and the magnetic field. In such SLAM setting, there is no ground truth of the vehicle location, thus the location of the vehicle has to be estimated concurrently with the magnetic field. This causes an uncertainty in both the vehicle location and value of the map at a particular vehicle location, which can be described probabilistically using various probability density functions (PDFs), e.g., using a Gaussian distribution in space and time, or by multimodal distributions.

In some embodiments, the probabilistic map includes a magnetic field function relating the measurements of the magnetic field to locations where the measurements of the magnetic field measurements are taken. The magnetic field function maintains timestamps of different locations and returns, upon submitting the measurements, the location, and the timestamp associated with the submitted measurements. Further, the probabilistic map produces a mean of the location based on the location returned by the magnetic field function and produces a variance of the location based on a difference between the current timestamp and the timestamp returned by the magnetic field function.

Accordingly, one embodiment discloses a vehicle, comprising: an actuator configured to change a current location of the vehicle in an environment; a magnetometer configured to measure a magnetic field based on the current location of the vehicle; a memory configured to store a probabilistic map of the environment relating measurements of the magnetic field and time of the measurements of the magnetic field to a probability of locations within the environment; a clock configured to timestamp the measurements of the magnetometer; and a processor configured to: estimate a probability of the current location in the environment based on a current measurement of the magnetometer at a current timestamp by submitting the current measurement and the current timestamp to the probabilistic map; and control the actuator based on a stochastic control employing the probability of the current location.

Accordingly, another embodiment discloses a method for controlling a vehicle in an environment. The method uses a processor coupled to a memory storing a probabilistic map of the environment relating measurements of a magnetic field and time of the measurements of the magnetic field to a probability of locations within the environment. The processor is coupled with stored instructions when executed by the processor carry out steps of the method comprising estimating a probability of the current location in the environment based on a current measurement of the magnetometer at a current timestamp by submitting the current measurement and the current timestamp to the probabilistic map, and controlling an actuator of the vehicle based on a stochastic control employing the probability of the current location.

Accordingly, yet another embodiment discloses a non-transitory computer readable storage medium embodied thereon a program executable by a processor for performing a method for controlling a vehicle in an environment, the storage medium stores a probabilistic map of the environment relating measurements of a magnetic field and time of the measurements of the magnetic field to a probability of locations within the environment, the program when executed by the processor carry out steps of the method, comprising: estimating a probability of the current location in the environment based on a current measurement of the magnetometer at a current timestamp by submitting the current measurement and the current timestamp to the probabilistic map; and controlling an actuator of the vehicle based on a stochastic control employing the probability of the current location.

BRIEF DESCRIPTION OF THE DRAWINGS

FIG. 8C shows a block diagram of an SNMPC that solves the constrained optimal control structured nonlinear programming problem, using statistical linearization-based state mean and covariance propagation equations, according to some embodiments of the present disclosure.

FIG. 11C illustrates an algorithm for automatic tuning of the time-varying reference tracking cost of the adaptive MPC controller, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
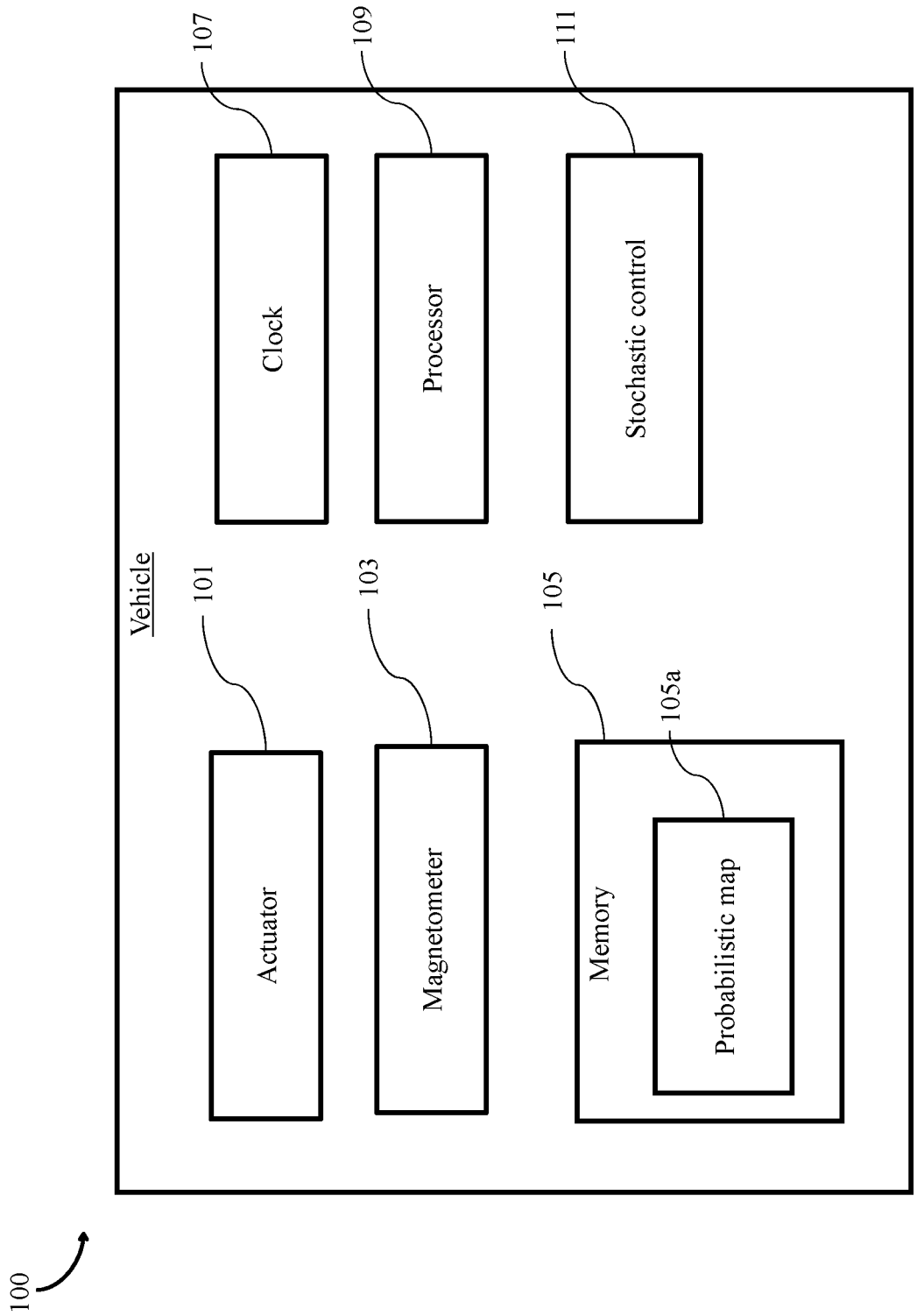
FIG. 1A shows a block diagram of a vehicle, according to some embodiments of the present disclosure.

FIG. 1A shows a block diagram of a vehicle 100, according to some embodiments of the present disclosure. As used herein, the vehicle 101 may be any type of wheeled vehicle, such as a passenger car, bus, or rover. Also, the vehicle 101 can be an autonomous or semi-autonomous vehicle. In some alternate embodiments, the vehicle 101 may be a drone, a mobile robot, or any other aerial or wheeled robot. It is an object of some embodiments to control the vehicle 100 in an environment. The environment may be an indoor environment, such as an indoor space of a building parking space, an indoor space a factory, an indoor space of a warehouse, and the like.

According to an embodiment, the vehicle 100 includes an actuator 101, a magnetometer 103, a memory 105, a clock 107, a processor 109, and a stochastic control 111. The processor 109 may be a single core processor, a multi-core processor, a computing cluster, or any number of other configurations. The memory 105 may include random access memory (RAM), read only memory (ROM), flash memory, or any other suitable memory systems. Additionally, in some embodiments, the memory 105 may be implemented using a hard drive, an optical drive, a thumb drive, an array of drives, or any combinations thereof.

The actuator 101 is configured to change a current location of the vehicle 100 in the environment. The magnetometer 103 is configured to measure a magnetic field based on the current location of the vehicle 100. Some embodiments employ a 9-axis IMU that includes a magnetometer that measures the magnetic field in three spatial dimensions. Other embodiments use a standalone magnetometer. The clock 107 is configured to timestamp the measurements of the magnetometer 103.

The memory 105 is configured to store a probabilistic map 105a of the environment. The probabilistic map 105a relates measurements of the magnetic field and time of the measurements of the magnetic field to a probability of locations within the environment.

Figure 1B:
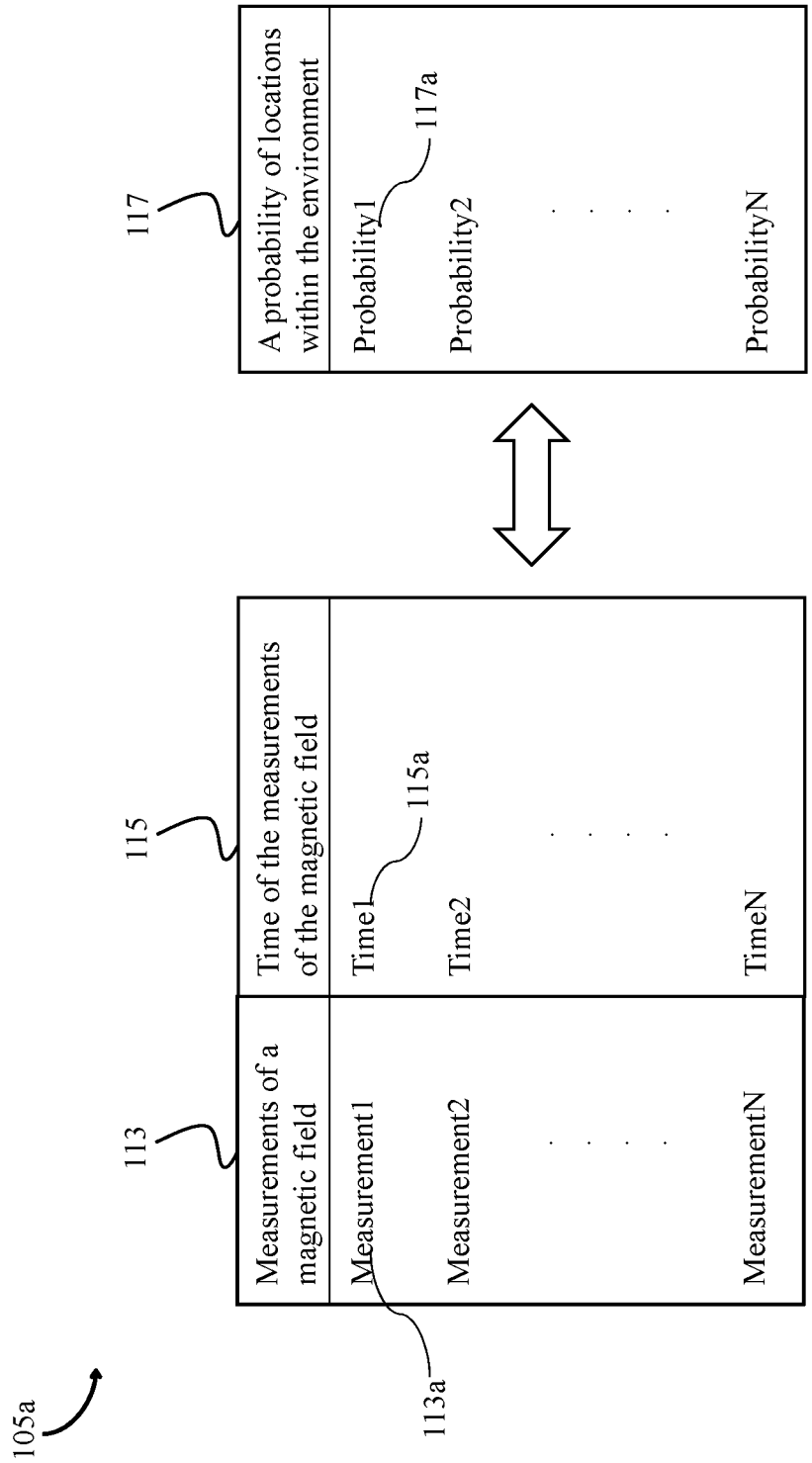
FIG. 1B illustrates a probabilistic map, according to an embodiment of the present disclosure.

FIG. 1B illustrates a probabilistic map 105a, according to an embodiment of the present disclosure. The probabilistic map 105a relates measurements 113 of the magnetic field and time 115 of the measurements of the magnetic field to a probability 117 of locations within the environment. The measurements 113 of the magnetic field include measurement1, measurement2, . . . , measurementN obtained at time instances time1, time2, . . . , timeN, respectively. The measurements 113 of the magnetic field and the time 115 of the measurements of the magnetic field are related to the probability 117 of locations within the environment. For instance, measurement1 113a obtained at a time instance time1 115a relates to a probability1 117a of a location of the vehicle 100 in the environment.

The processor 109 is configured to estimate a probability of the current location of the vehicle 100 in the environment using the probabilistic map 105a. For example, the processor 109 is configured to obtain a current measurement of the magnetometer 103 at a current timestamp. Further, the processor 109 is configured to submit the current measurement and the current timestamp to the probabilistic map 105a to estimate the probability of the current location of the vehicle 100.

Further, the processor 109 is configured to control the actuator 101 based on a stochastic control 111 that employs the estimated probability of the current location. To perform the stochastic control 111, the processor 109 is configured to execute a nonlinear stochastic model-predictive controller (SMPC) to produce a control command and submit the control command to the actuator 101. The control command may include values of one or combination of a steering angle of the wheels of the vehicle and a rotational velocity of the wheels. Different implementations of the stochastic control 111 are explained in detail in FIG. 7A, FIG. 7B, FIG. 8A, FIG. 8B, FIG. 8C, and FIG. 8D.

In some embodiments, the probabilistic map 105a is a map of the magnetic field that probabilistically relates the measurements of the magnetic field to locations where the measurements of the magnetic field measurements are taken. Treating the map as probabilistic is beneficial because magnetometer measurements are inherently noisy, and the exact location of the magnetometer corresponding to a particular magnetic field measurement is uncertain. For example, some embodiments determine the probabilistic map using simultaneous localization and mapping (SLAM) of the vehicle location and the magnetic field. In such SLAM setting, there is no ground truth of the vehicle location, thus the location of the vehicle 100 has to be estimated concurrently with the magnetic field. This causes an uncertainty in both the vehicle location and value of the map at a particular vehicle location, which can be described probabilistically using various probability density functions (PDFs), e.g., using a Gaussian distribution in space and time, or by multimodal distributions.

Figure 2A:
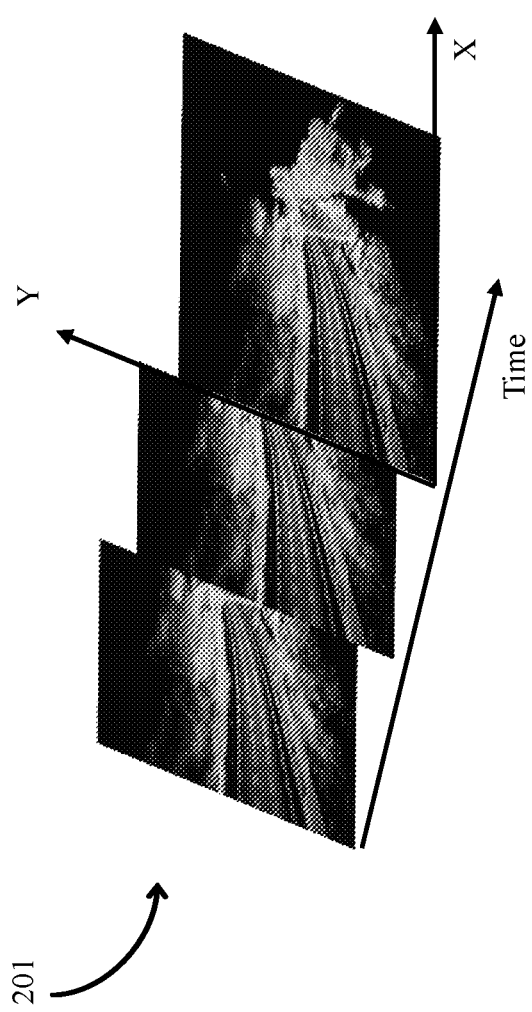
FIG. 2A illustrates a continuous representation of the probabilistic map in space and time, according to an embodiment of the present disclosure.
Figure 2B:
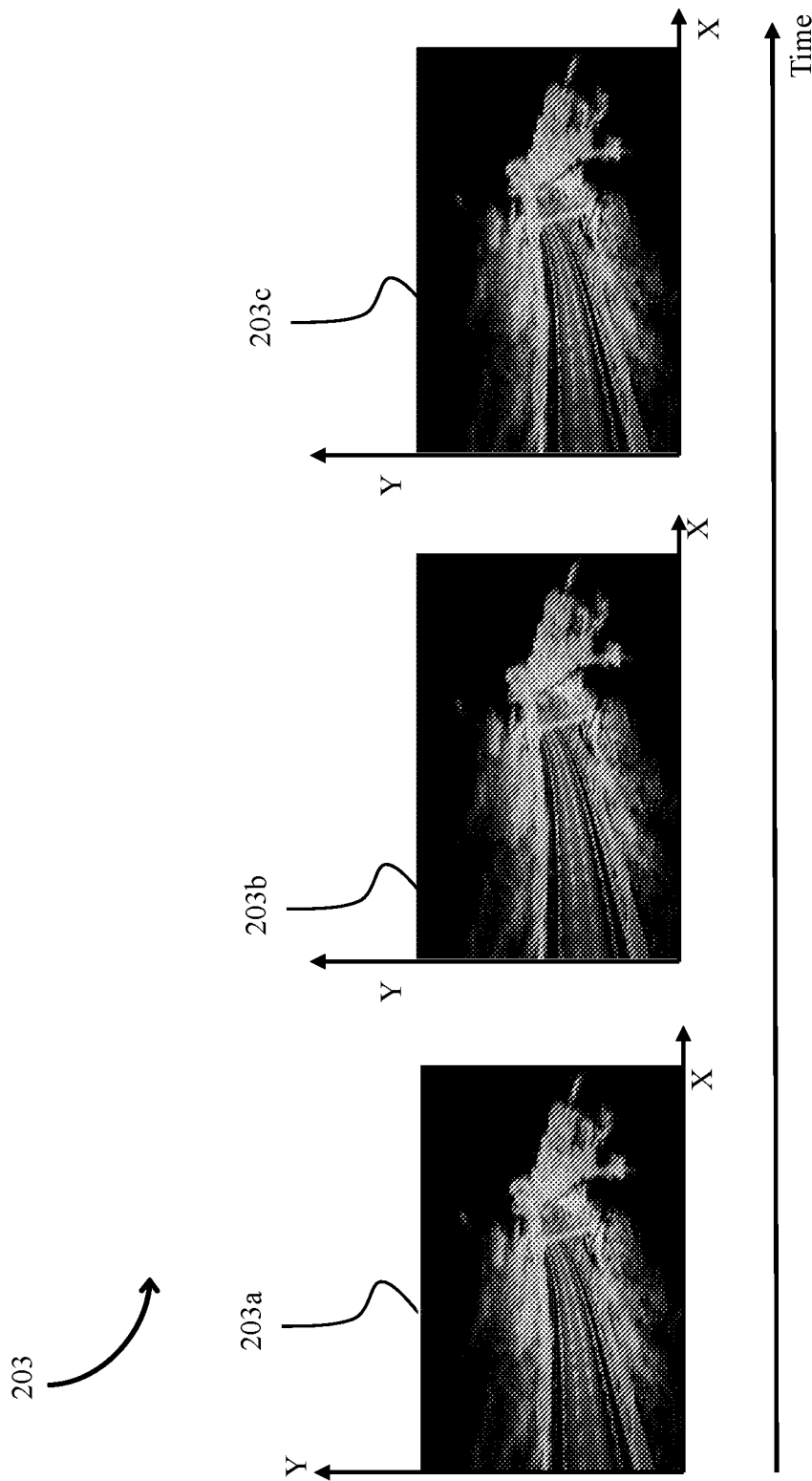
FIG. 2B illustrates a continuous representation of the probabilistic map in space, according to an embodiment of the present disclosure.

In some other embodiments, the probabilistic map 105a is a map including time. That is, the probabilistic map 105a includes magnetic field levels in spatial 3-dimensional coordinates, as well as a time component, implying a 4-dimensional map. In some other embodiments, the probabilistic map 105a includes the magnetic field levels in spatial 3-dimensional coordinates, for different time steps. For example, the probabilistic map 105a is considered as a continuous representation 201 of the probabilistic map 105a in space and time, as shown in FIG. 2A. In another example, the probabilistic map 105a is considered as a continuous representation 203 of the probabilistic map 105a in space, wherein the memory 105 stores the probabilistic map 105a as a series of snapshots including a snapshot 203a, a snapshot 203b, and a snapshot 203c for discrete time steps. Including time into the probabilistic map 105a is beneficial, because although the magnetic field is spatially dominated, there is a time varying component that may lead to erroneous estimations of the vehicle location if the time varying component is not taken into account.

In some embodiments, the probabilistic map 105a includes a magnetic field function relating the measurements of the magnetic field to locations where the measurements of the magnetic field measurements are taken. For instance, some embodiments model the magnetic field according to $$x_{k+1} = f(x_k) + w_k$$
$$y_k = h(x_k) + e_k,$$

where $x_k$ is a vehicle state at time step k including the vehicle location, $y_k$ is the magnetometer measurement, h(p) is the magnetic field function dependent on location p of the vehicle. Function f describes a motion of the vehicle, and noise terms w and e account for modeling errors and magnetometer measurement noise. In some embodiments, curl-free property of magnetic fields are leveraged to design the magnetic field function that minimizes computational complexity. From Maxwell's equations, the curl-free property $\nabla \times h=0$ is utilized to model the magnetic field function based on physics.

In some embodiments, the magnetic field function is a function of space and time such that $y_k=h(p_k, k)+e_k$. In other words, the magnetic field function maintains timestamps of different locations. Such a magnetic field function returns, upon submitting the measurements, the location of the vehicle 100, and the timestamp associated with the submitted measurements. Further, the location and the timestamp returned by the magnetic field function are used to determine a mean of the location of the vehicle 100 and a variance of the location of the vehicle 100, as described below in FIG. 3.

Figure 3:
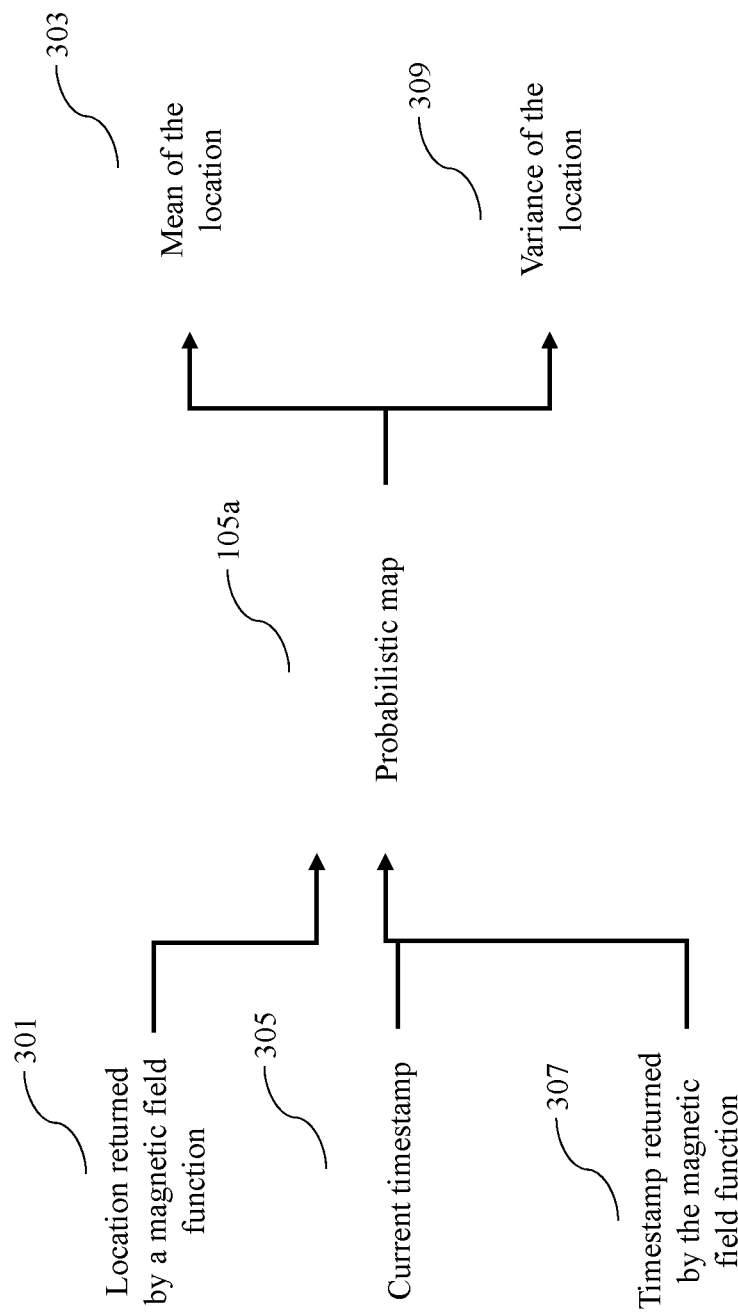
FIG. 3 illustrates determination of a mean of a location of the vehicle and a variance of the location of the vehicle, according to some embodiments of the present disclosure.

FIG. 3 illustrates determination of a mean 303 of the location of the vehicle 100 and a variance 309 of the location of the vehicle 100, according to some embodiments of the present disclosure. The probabilistic map 105a produces the mean 303 of the location based on a location 301 returned by the magnetic field function. Further, the probabilistic map 105a produces a variance 309 of the location based on a difference between a current timestamp 305 and a timestamp returned 307 by the magnetic field function. In some embodiments, the probabilistic map 105a includes a probabilistic function of a map of the environment that maintains timestamps of different locations. The probabilistic function includes time-varying uncertainty defined by a difference between the current timestamp 305 and a timestamp associated with the current location.

In some embodiments, the processor 109 is configured to perform a joint localization of the vehicle 100 and mapping of the magnetic field based on the current measurement of the magnetometer 103 and the current timestamp 305 to produce the probabilistic map 105a with time-varying uncertainty. Further, the processor 109 updates the probabilistic map 105a based on the current measurements of the magnetic field and updates the time-varying uncertainty associated with the current location based on the current timestamp 305.

In some embodiments, the processor 109 is configured to update the timestamp of the probabilistic function associated with the current location based on the current timestamp 305. Doing in such a manner ensures that measurements taken at a current location at a current time can be used to properly update the probabilistic map 105a, and thereby the location and its uncertainty reflecting the difference in timestamps.

Some embodiments are based on the realization that the location of the vehicle 100 can be determined based on an inverse of the magnetic field function. Such an embodiment is described below in FIG. 4.

Figure 4:
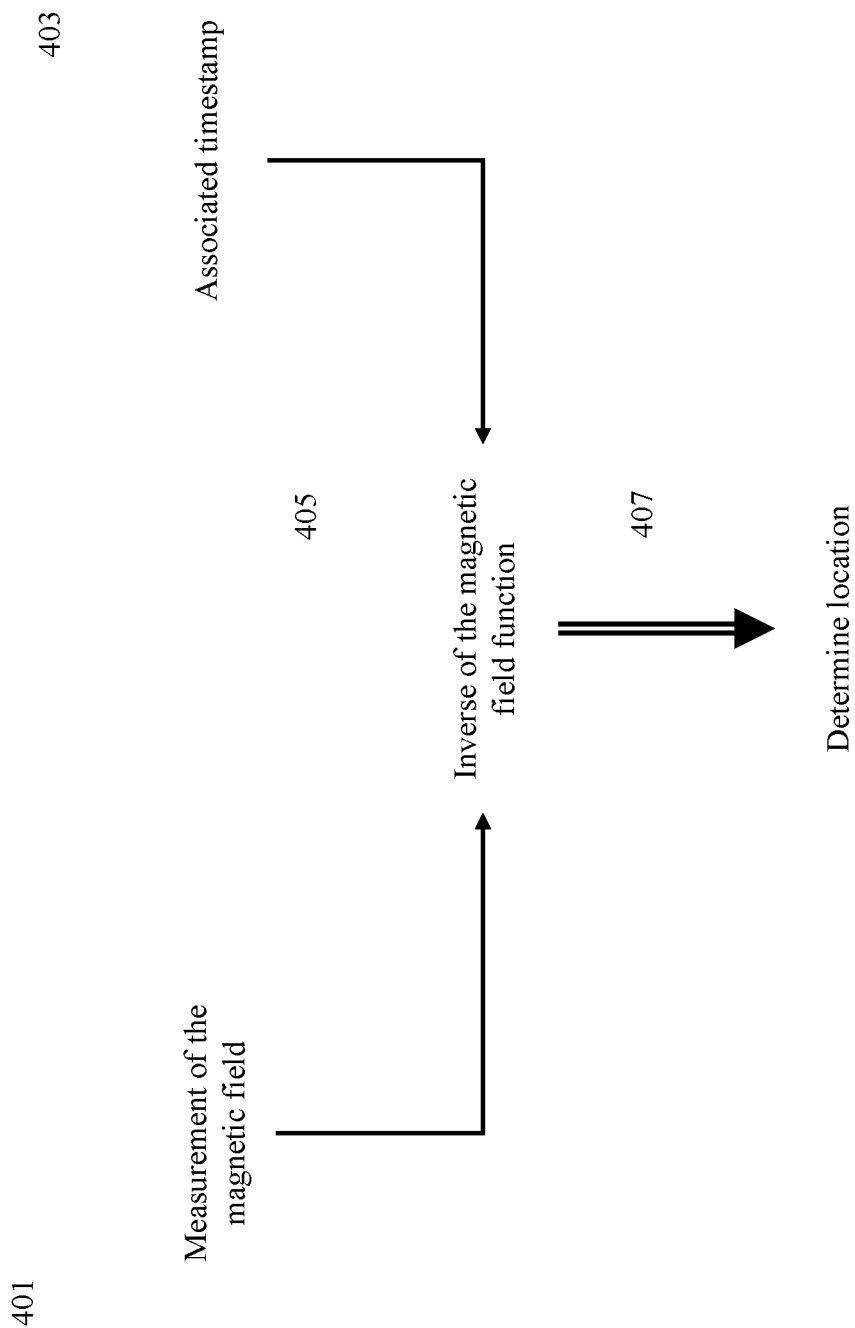
FIG. 4 illustrates determination of the location of the vehicle based on an inverse of a magnetic field function, according to some embodiments of the present disclosure.

FIG. 4 illustrates determination of the location of the vehicle 100 based on the inverse of the magnetic field function, according to some embodiments of the present disclosure. The processor 109 is configured to receive measurement 401 of the magnetic field and associated timestamp 403. Further, the processor 109 is configured to determine a location 407 of the vehicle 100 by submitting the measurement 401 of the magnetic field and the associated timestamp 403 to an inverse of the magnetic field function 405.

In one embodiment, the inverse of the magnetic field function 405 is determined by a nonlinear least squares fit. In another embodiment, the inverse of the magnetic field function 405 is determined by solving a SLAM problem solving a joint posterior PDF of the vehicle location and the magnetic field function, given magnetometer measurement history, $p(x_{0:k}, h|y_{0:k})$.

In some embodiments, the magnetic-field function and the vehicle location are determined by executing a probabilistic filter as described below in FIG. 5.

Figure 5:
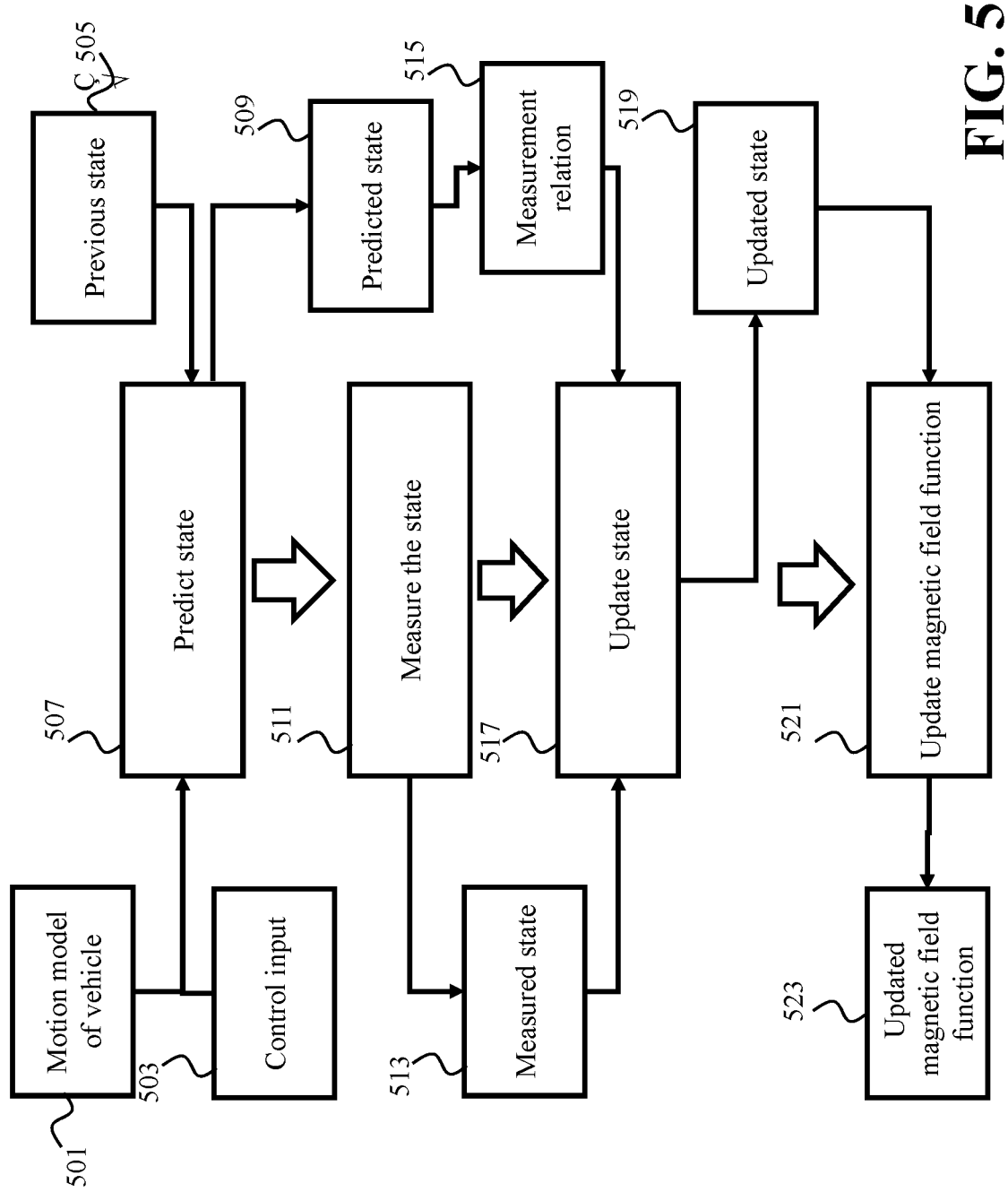
FIG. 5 shows a flowchart of an execution of one iteration of a probabilistic filter for determining the magnetic-field function and the vehicle location, according to one embodiment of the present disclosure.

FIG. 5 shows a flowchart of an execution of one iteration of the probabilistic filter for determining the magnetic-field function and the vehicle location, according to one embodiment of the present disclosure. Based on a motion model 501 of the vehicle 100, a control input 503 determined during a previous iteration, and a previous state 505 of the vehicle 100, the processor 109 is configured to predict 507 a state of the vehicle to produce a predicted state 509. The state of the vehicle 100 may include the location of the vehicle 100. Further, the processor 109 is configured to measure 511 the state of the vehicle 100 to produce a measured state 513.

Using the measured state 513 and a measurement relation 515 relating the predicted state 509 to the measured state 513 through the magnetic field function, the processor 109 is configured to update 517 the state to produce an updated state 519. Further, the processor 109 is configured to update 521 the magnetic field function to produce an updated magnetic field function 523.

Some embodiments are based on the understanding that the magnetic field function can be represented as a time-varying Gaussian process. Some embodiments are based on a recognition that to update the magnetic field function there is a need to update the Gaussian process, which is a computationally challenging problem. This is because the update of the Gaussian process using a set of measurements indicative of the magnetic field and the location of the vehicle 100 grows unfavorably with a length of a sequence of the measurements, such that it becomes computationally intractable to perform a recursive update of the Gaussian process for real-world systems, such as the vehicle 100. Some embodiments are based on the realization that to efficiently update the Gaussian process, a structural constraint on a shape of a function of the magnetic field function according to $\nabla \times h = 0$ is to be incorporated into the Gaussian process.

To this end, some embodiments are based on the understanding that the Gaussian process can be modeled as a set of weighted basis functions, wherein weights of the weighted basis functions are distributed according to a Gaussian distribution. Doing in such a manner considerably simplifies learning problem associated with the magnetic field function since the problem of learning the magnetic field function is reduced to learning the weights of the respective basis function. In other words, to update the Gaussian process some embodiments can just update the Gaussian distributions of the weights, and to determine the magnetic field function some embodiments can just determine N scalar weights from the Gaussian distribution. In effect, regarding the magnetic field function as a weighted combination of basis functions significantly decreases the computational requirements for estimating the magnetic field function in a probabilistic manner.

Figure 6A:
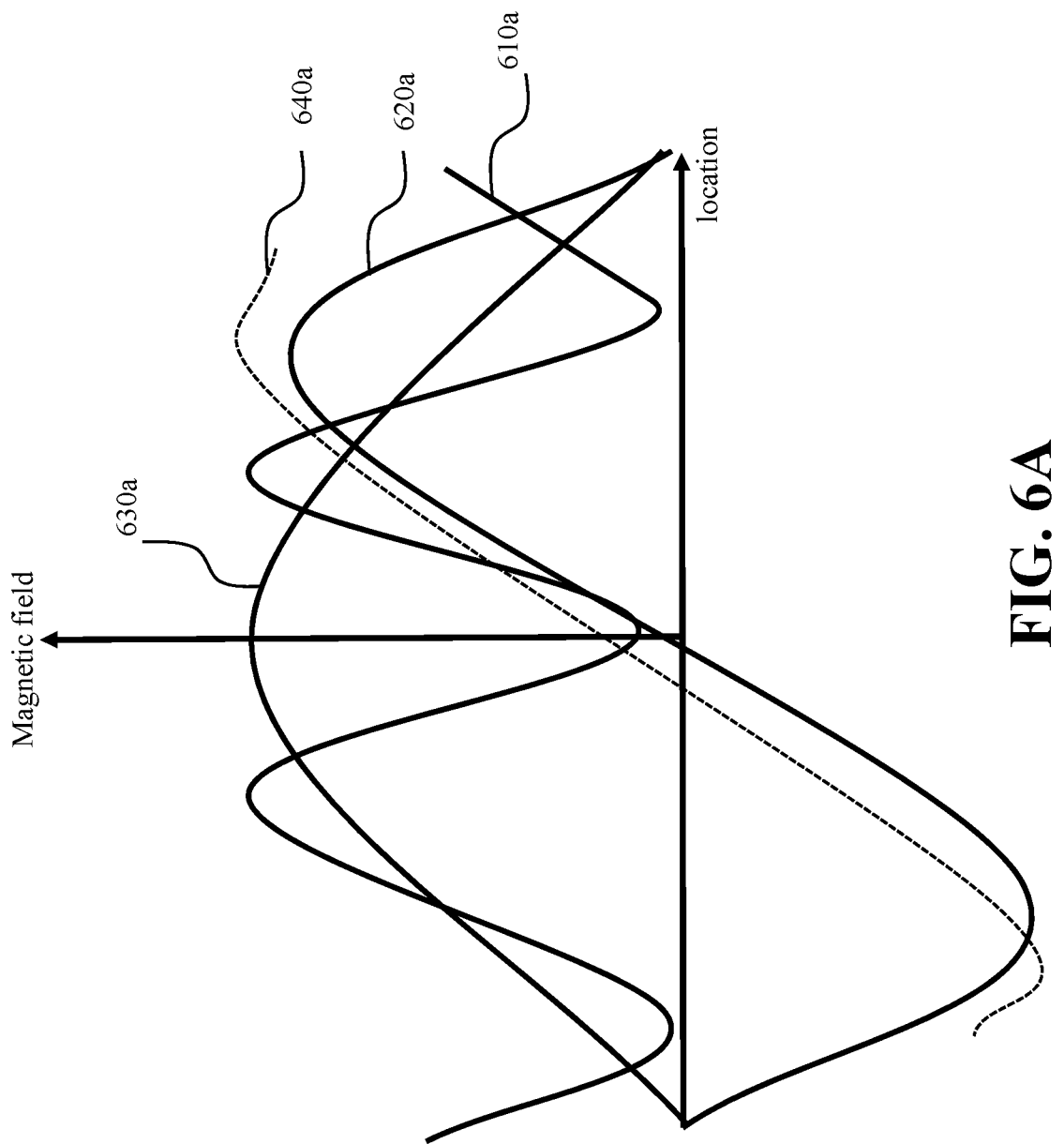
FIG. 6A illustrates weighted basis functions, according to one embodiment of the present disclosure.

FIG. 6A illustrates the weighted basis functions, according to one embodiment of the present disclosure. By combining different basis functions, e.g., a basis function 610$a$, 620$a$, and 630$a$, and using different weights for each basis function, a true function 640$a$ of the magnetic field can be determined. The true function 640$a$ of the magnetic field maps a location of the vehicle 100 to a measurement of the magnetic field at a particular time.

Figure 6B:
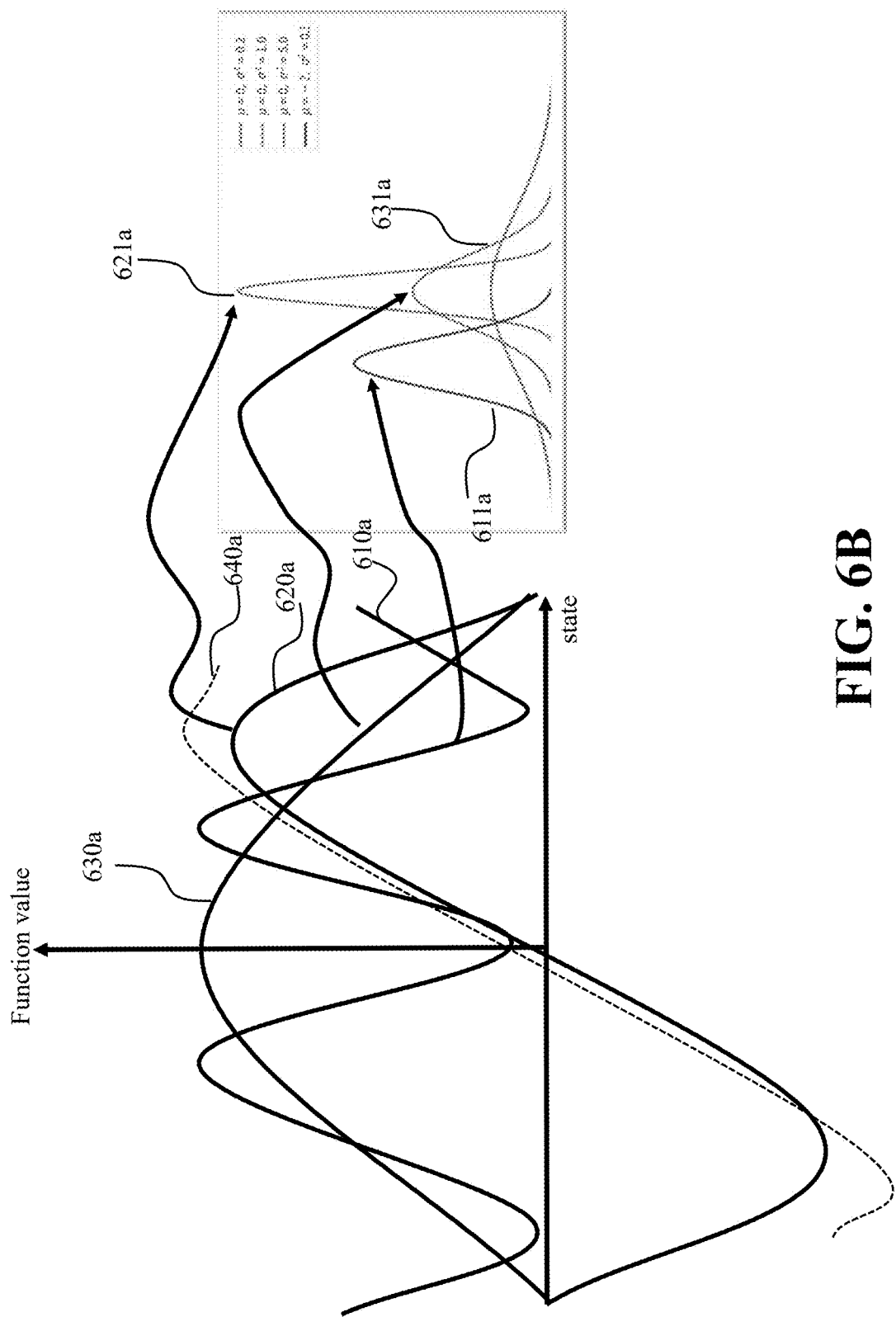
FIG. 6B shows an illustration of a mean value of a weight and a covariance of the weight associated with different basis functions, according to some embodiment of the present disclosure.

FIG. 6B shows an illustration of a mean value of the weight and a covariance of the weight associated with the different basis functions, according to some embodiment of the present disclosure. For example, the basis function 630$a$ has a weight distribution 631$a$, the basis function 620$a$ has a weight distribution 621$a$, and the basis function 610$a$ has a weight distribution 611$a$.

Figure 6C:
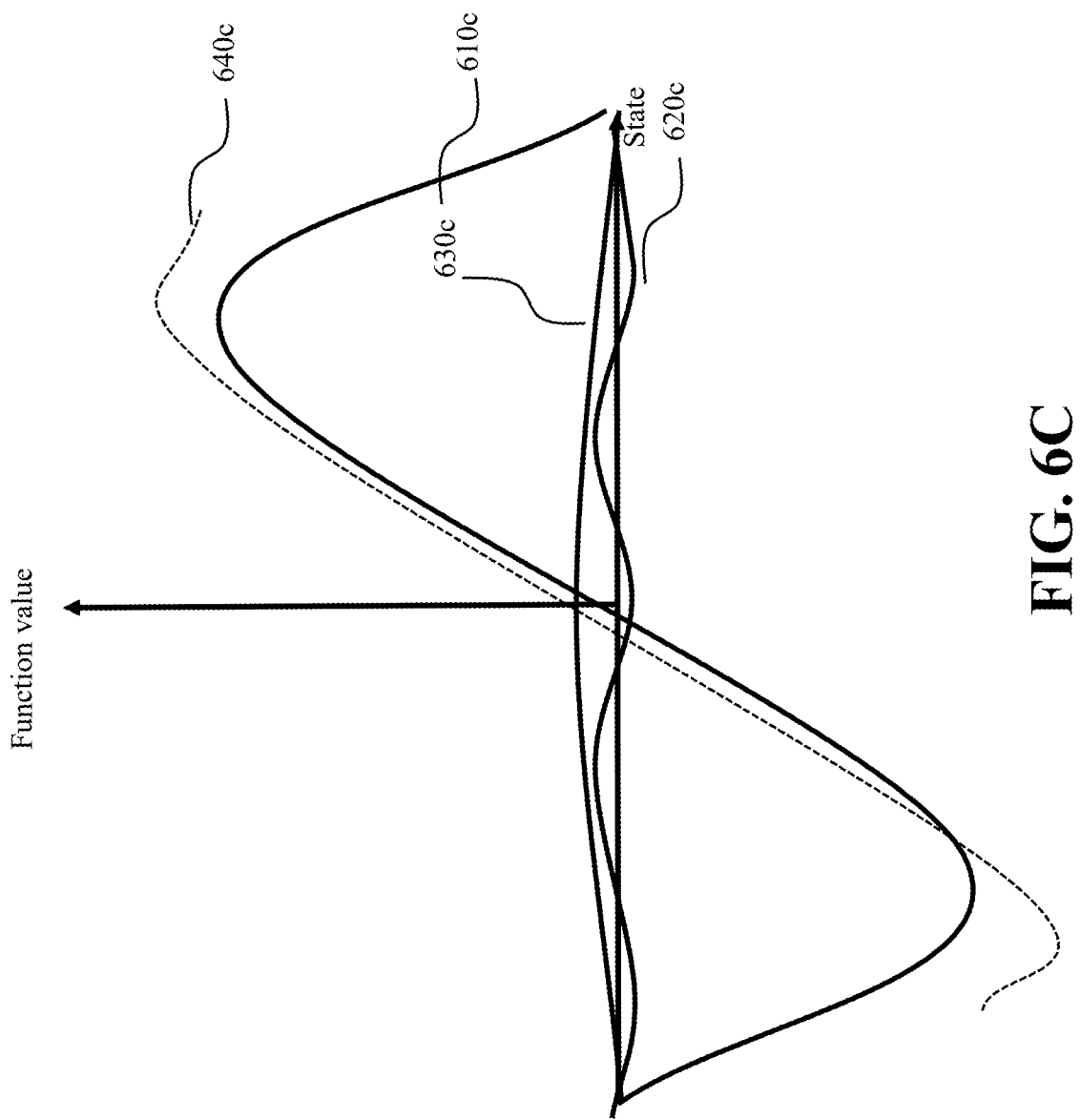
FIG. 6C shows an illustration of influence of the weights of the different basis functions for a subset of the magnetic field function, in accordance with some embodiments of the present disclosure.

FIG. 6C shows an illustration of the influence of the weights of the basis functions for a subset of the magnetic field function 640$c$, in accordance with some embodiments of the present disclosure. By letting weights of a basis function 620$c$ and a basis function 630$c$ be very small, and a weight of a basis function 610$c$ be large, the basis function expansion can reproduce a magnetic field function 640$c$ with only one basis function.

In some embodiments, to update a probability distribution of the magnetic field function 640$c$, the processor 109 is configured to update the Gaussian distribution of at least some weights of the different basis functions. For instance, one embodiment models the magnetic field function as $h(p) \sim \mathcal{GP}(0, \kappa(p, p'))$, wherein a covariance function $\kappa(p, p')$ of the Gaussian process is formulated in terms of Laplace operators $\kappa \approx \kappa_c + \sum_{j=1}^{M} S(\lambda_j) \phi_j(p) \phi_j(p')$, wherein S has a spectral density $$S(\omega) = \sigma^2 \sqrt{2\pi l^2} \exp\left(-\frac{\pi^2 l^2 \omega^2}{2}\right),$$

and the basis functions are expressed according to $$\phi_{j_1, \ldots, j_3} = \prod_{n=1}^{3} \frac{1}{\sqrt{L_n}} \sin\left(\frac{\pi j n (x_n + L_n)}{2 L_n}\right)$$

-continued
$$\lambda_{j_1, \ldots, j_3} = \sum_{n=1}^{n_x} \left(\frac{\pi j n}{2 L_n}\right)^2,$$

wherein the weights are Gaussian distributed, $\gamma_{ij} \sim \mathcal{N}(0, S(\lambda_j))$.

Other embodiments utilize that the structural constraint $\nabla \times h = 0$ on the magnetic field function can be interpreted as a matrix multiplication constraint $\mathcal{H} h = 0$, where $$\mathcal{H} = \begin{bmatrix} 0 & -\frac{\partial}{\partial x_1} & \frac{\partial}{\partial x_2} \\ \frac{\partial}{\partial x_3} & 0 & -\frac{\partial}{\partial x_1} \\ -\frac{\partial}{\partial x_2} & -\frac{\partial}{\partial x_1} & 0 \end{bmatrix}$$

Some embodiments are based on the realization that to improve computational performance of performing SLAM, it is beneficial to reduce dimensionality of the basis function expansion of the magnetic field function. To this end, some embodiments determine a scalar basis function expansion g according to $(x) = \sum_{j=1}^{M} \gamma_j \phi_j(x)$, and then determine the magnetic field function as $h = \nabla g$. Next, the function relating the magnetic field measurements to the vehicle location can be written as $$y_k = \frac{\begin{bmatrix} c^T & 0 & 0 \\ 0 & c^T & 0 \\ 0 & 0 & c^T \end{bmatrix}}{c} \frac{vec(\nabla_{\phi_1}, \ldots, \nabla_{\phi_M})}{\varphi(x_k)} + e_k$$

Figure 6D:
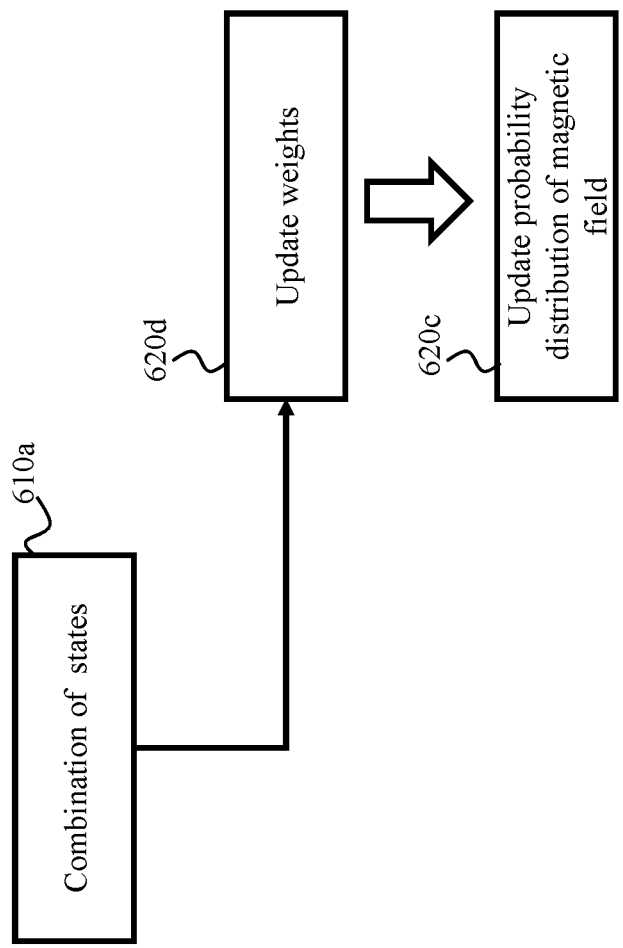
FIG. 6D illustrates updating a probability distribution of the magnetic field function, according to one embodiment of the present disclosure.

FIG. 6D illustrates updating the probability distribution of the magnetic field function, according to one embodiment of the present disclosure. The processor 109 updates 620$d$ the weights of the basis functions using a combination of states 610$a$ of the vehicle 100 and measurement. Further, the processor 109 updates 620$c$ the probability distribution 620$d$ of the magnetic field function according to the basis functions weighted with the updated weights.

Figure 6E:
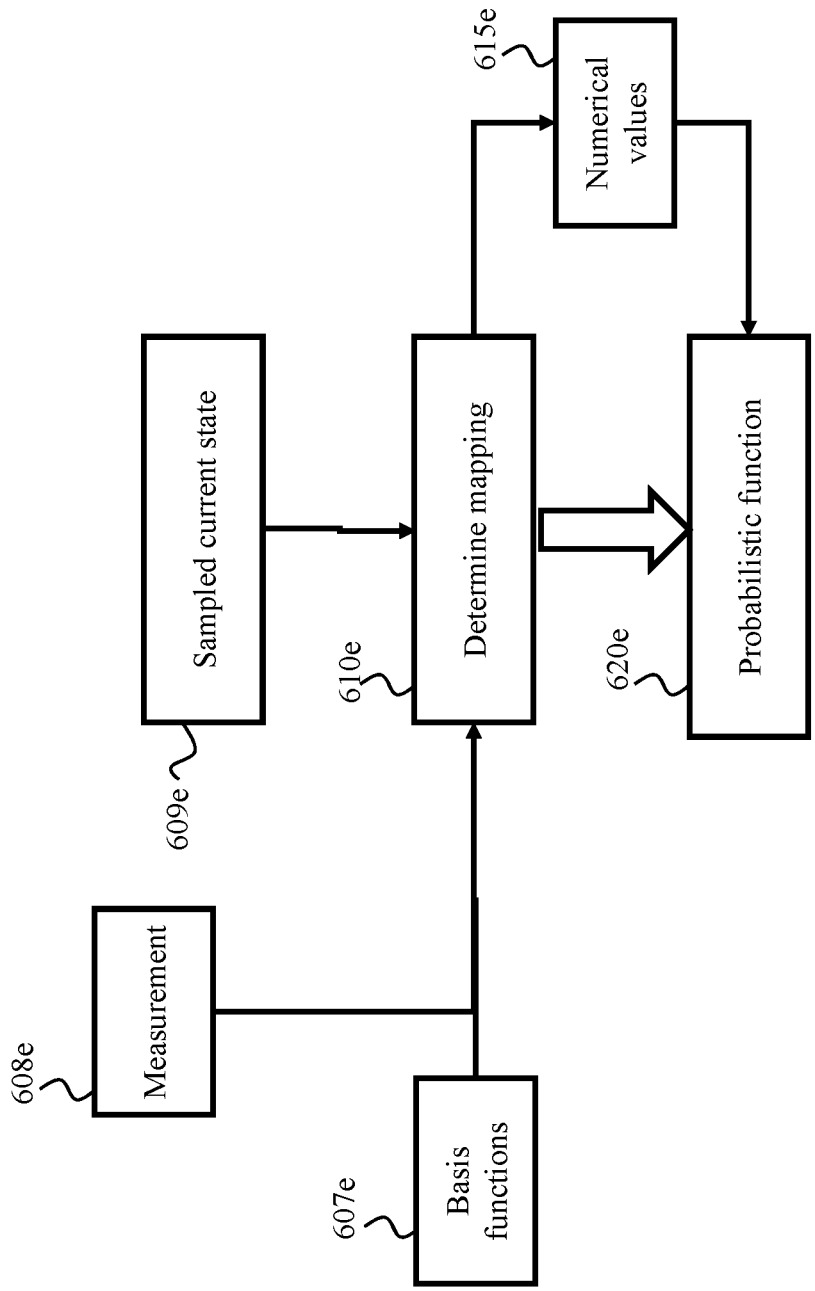
FIG. 6E illustrates a block diagram for determining a combination of states for updating weights of the different basis functions, according to one embodiment of the present disclosure.

FIG. 6E illustrates a block diagram for determining the combination of states 610$a$ for updating the weights of the basis functions, according to one embodiment of the present disclosure. Using a current sampled state 609$e$ inserted into the basis functions 607$e$ and measurement 608$e$, the processor 109 determines 610$e$ a mapping that maps the current sampled state 609$e$ and the measurement 608$e$ to numerical values 615$e$ stored in matrices. Then, the processor 109 uses the numerical values 615$e$ and a probabilistic function 620$e$ mapping the numerical values 615$e$ to a distribution of the weights.

Some embodiments determine the weights of the basis functions probabilistically by estimating a distribution, $p(x_{0:k}, c_k | y_{0:k}) = p(c_k | x_{0:k}, y_{0:k}) p(x_{0:k} | y_{0:k})$ of the vehicle state and basis function weights.

Some embodiments express the distribution of time varying weights as $p(c_k | x_{0:k}, y_{0:k}) = \mathcal{N}(c_k | \psi_{k|k} \Xi^{-1}, \sigma^2 \Xi^{-1})$, where the involved expressions are determined according to $\psi_{k|k} = \psi_{k|k-1} + \sum_{j=1}^{3} y_k$, $k \varphi(x_k)^T \Sigma_{k|k} = \Sigma_{k|k-1} + \varphi(x_k) \varphi(x_k)^T$. In other words, the distribution of the weights, hence the distribution of the magnetic field function and therefore the probabilistic function of the map, is updated according to vector additions and multiplications.

Some embodiments are based on the recognition that the magnetic field is time varying, and a measurement at a particular location can be different at two different time steps. To this end, some embodiments maintain the notion of time in the magnetic field function, such that time evolution of the probabilistic map 105a is done as $$\psi_{k|k-1} = \lambda \psi_{k-1|k-1},$$
$$\Sigma_{k|k-1} = \lambda \Sigma_{k-1|k-1},$$

where $\lambda \leq 1 | \lambda \leq 1$ is a positive scalar that makes the probabilistic map 105a trust newer measurements more than older measurements, to account for the time varying component of the magnetic field.

According to some embodiments, the mean 303 of the location of the vehicle 100 and the variance of the location 100 of the vehicle can be propagated into the stochastic control to determine the control commands to the actuator 101 of the vehicle. Some embodiments use a discrete-time or discretized propagation of the mean and the covariance of the vehicle location into the stochastic control 111 to determine the control commands, as described below in FIG. 7A.

Figure 7A:
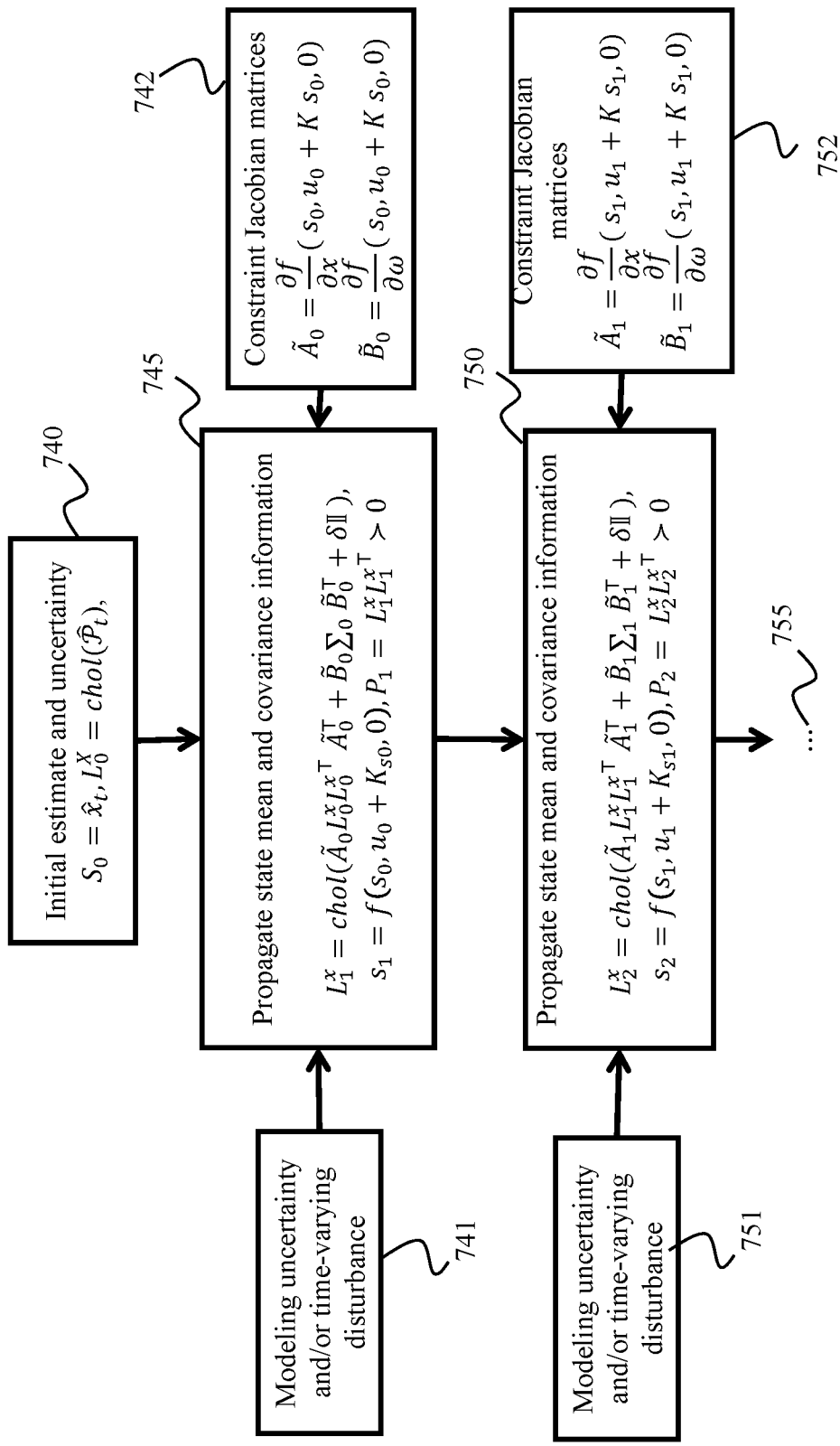
FIG. 7A shows a block diagram of a discrete-time or discretized propagation of a mean and a covariance of the vehicle location into a stochastic control using explicit linearization-based propagation equations, according to some embodiments of the present disclosure.

FIG. 7A shows a block diagram of a discrete-time or discretized propagation of the mean and the covariance of the vehicle location into the stochastic control 111, according to some embodiments of the present disclosure. Given an initial location estimate and corresponding uncertainty 740 and given a Gaussian approximation of the probability density function for (time-varying) uncertainties and/or disturbances in the vehicle 100 subject to an uncertainty in the magnetic field, the propagation is performed using explicit linearization-based propagation equations for the discrete-time or discretized nonlinear system dynamics. In some embodiments, the discrete-time or discretized nonlinear system dynamics can be represented as $x_{k+1}=f(x_k, u_k, w_k)$, where $x_k$, $u_k$ and $w_k$ denote state variables, control inputs and disturbance variables at time step $t_k$, respectively, and $x_{k+1}$ denotes the state variables at the next time step $t_{k+1}$. In some embodiments, a dynamical model of the vehicle 100 includes a set of continuous-time differential equations, e.g., explicit and/or implicit ordinary differential equations (ODEs) or explicit and/or implicit differential-algebraic equations (DAEs). In some embodiments, the dynamical model of the vehicle 100 includes a discretization of the set of continuous-time differential equations using a numerical integration method, e.g., using linear multistep methods, explicit or implicit Runge-Kutta methods, backward differentiation formulas or finite element methods.

The block diagram in FIG. 7A illustrates steps of a linearization-based propagation of the mean and the covariance, e.g., including a first propagation step 745, followed by a propagation step 750 and potentially one or multiple additional propagation steps 755. The propagation is based on an initial estimate $s_0 = \hat{x}_t$ and an initial uncertainty, which can be represented by a state covariance $\hat{P}_t$ and/or by its Cholesky factor $L_0^x = chol(\hat{P}_t)$ such that $\hat{P}_t = L_0^x L_0^{x^T}$ or $\hat{P}_t = L_0^{x^T} L_0^x$, using either a forward or reverse Cholesky factorization. Given the initial estimate and the uncertainty 740, and given modeling uncertainty and/or (time-varying) disturbance $w_0 \sim \mathcal{N}(0, \Sigma_0)$ 741 and given differentiation-based constraint Jacobian matrices 742, the explicit linearization-based propagation equations can compute an approximation to the mean and the covariance, $s_1$ and $P_1 = L_1^x L_1^{x^T}$ at the next time step 745 as follows $$L_1^x = chol\left(\tilde{A}_0 L_0^x L_0^{x^T} \tilde{A}_0^T + \tilde{B}_0 \sum_0 \tilde{B}_0^T + \delta \mathbb{I}\right),$$
$$s_1 = f(s_0, u_0 + Ks_0, 0), P_1 = L_1^x L_1^{x^T} \succ 0$$

and the constraint Jacobian matrices 742 are defined as follows $$\tilde{A}_0 = \frac{\partial f}{\partial x}(s_0, u_0 + Ks_0, 0)$$
$$\tilde{B}_0 = \frac{\partial f}{\partial \omega}(s_0, u_0 + Ks_0, 0)$$

where matrix K denotes a feedback gain matrix to pre-stabilize the nonlinear system dynamics and chol(•) represents a forward or reverse Cholesky factorization. Some embodiments are based on the realization that a small regularization parameter value $\delta > 0$ can be used to ensure that the Cholesky factorization operator can be defined everywhere, i.e., to ensure that a positive semi-definite matrix becomes positive definite, and to ensure that the Cholesky factorization operator can be differentiated to evaluate first and/or higher order derivatives for implementation of a stochastic predictive controller.

Similarly, given the mean and the covariance, $s_1$ and $P_1 = L_1^x L_1^{x^T}$ at one time step 745, and given modeling uncertainty and/or (time-varying) disturbance $w_1 \sim \mathcal{N}(0, \Sigma_1)$ 751 and given differentiation-based constraint Jacobian matrices 752, the explicit linearization-based propagation equations can compute an approximation to the mean and the covariance, $s_2$ and $P_2 = L_2^x L_2^{x^T}$ at the next time step 750 as follows $$L_2^x = chol\left(\tilde{A}_1 L_1^x L_1^{x^T} \tilde{A}_1^T + \tilde{B}_1 \sum_1 \tilde{B}_1^T + \delta \mathbb{I}\right),$$
$$s_2 = f(s_1, u_1 + Ks_1, 0), P_2 = L_2^x L_2^{x^T} \succ 0$$

where the constraint Jacobian matrices 752 are defined as follows $$\tilde{A}_1 = \frac{\partial f}{\partial x}(s_1, u_1 + Ks_1, 0)$$
$$\tilde{B}_1 = \frac{\partial f}{\partial \omega}(s_1, u_1 + Ks_1, 0)$$

Finally, one or multiple additional steps 755 can be performed in the discrete-time or discretized propagation of the mean and the covariance, using the explicit linearization-based propagation equations for the discrete-time or discretized nonlinear system dynamics.

Figure 7B:
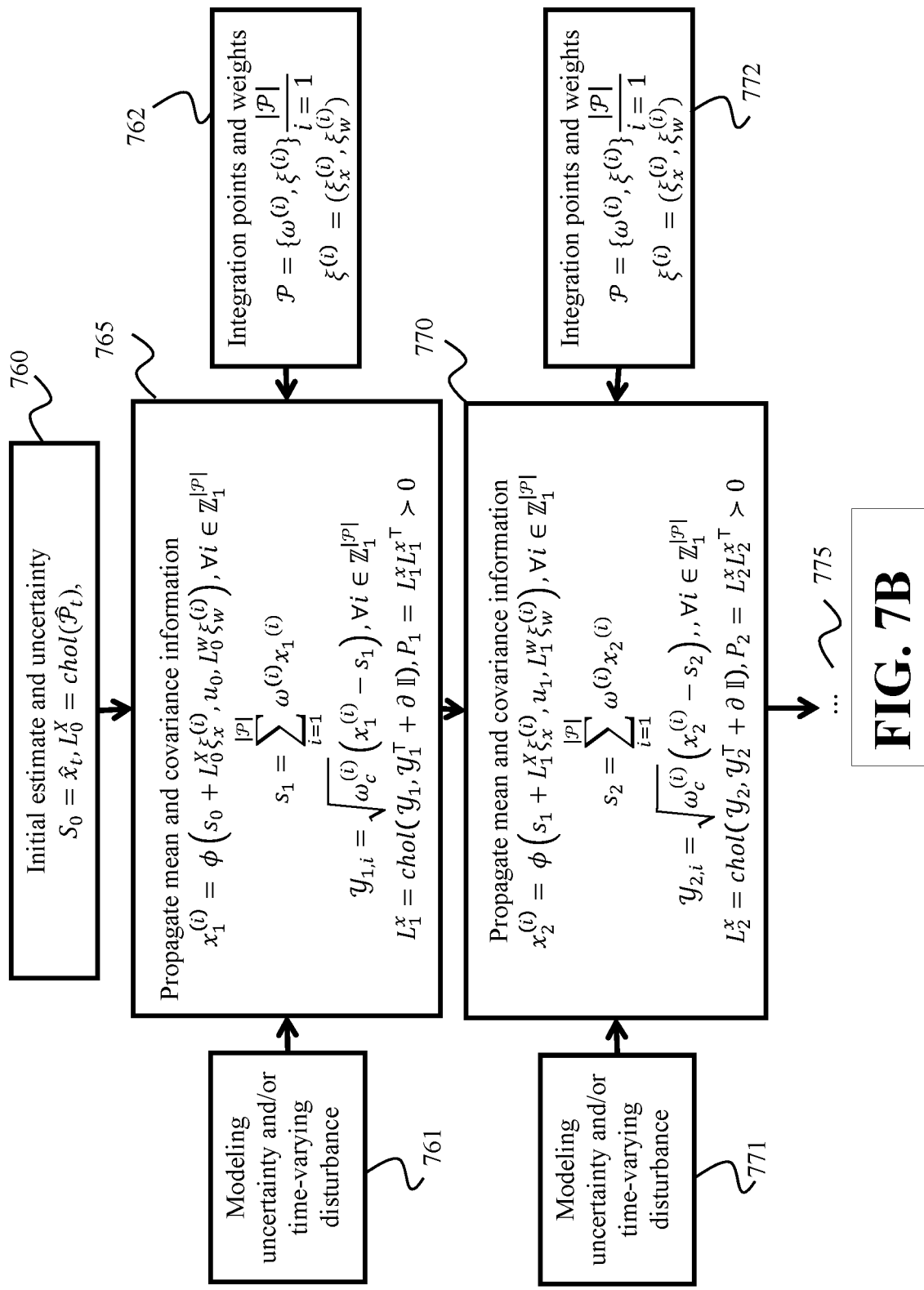
FIG. 7B shows a block diagram of a discrete-time or discretized propagation of the mean and the covariance of the vehicle location into the stochastic control using statistical linearization-based propagation equations, according to some embodiments of the present disclosure.

FIG. 7B shows a block diagram of a discrete-time or discretized propagation of the mean and the covariance, according to some embodiment so the present disclosure. Given an initial location estimate and corresponding uncertainty 760 and given a Gaussian approximation of the PDF for the (time-varying) uncertainties and/or disturbances in the vehicle 100, the discrete-time or discretized propagation of the mean and the covariance can be performed using statistical linearization-based propagation equations for the discrete-time or discretized nonlinear system dynamics. Some embodiments are based on the realization that density filters use a statistical linearization, based on approximated matching of one and/or multiple higher-order moment integrals, instead of an explicit linearization based on a Taylor series approximation. For example, in some embodiments, numerical integration or cubature rules can be used in assumed density filters to approximate the first and/or second-order moment integrals $$\mathbb{E}[x_{k+1}] = \int_{\mathbb{R}^n} F(v)p(v)dv,$$

$$\text{Cov}[x_{k+1}] = \int_{\mathbb{R}^n} (F(v) - \mathbb{E}[\cdot])(F(v) - \mathbb{E}[\cdot])^T p(v)dv,$$

given a Gaussian approximation $$p(v) \approx \mathcal{N}\left(\begin{bmatrix} \mathbb{E}[x_k] \\ 0 \end{bmatrix}, \begin{bmatrix} \text{Cov}[x_k] & 0 \\ 0 & \Sigma_k \end{bmatrix}\right)$$

of the PDF for variables v=(x, w), which denotes concatenation of the state x and disturbance variables w, and function F(v)=f(x, u, w) represents the discrete-time or discretized nonlinear system dynamics. In some embodiments, ADF-type moment matching is used to compute approximations of the mean $s_{k+1} \approx \mathbb{E}[x_{k+1}]$ and of the covariance $P_{k+1} \approx \text{Cov}[x_{k+1}]$, resulting in a Gaussian approximation of a conditional PDF $$p(x_{k+1} \mid x_k) \approx \mathcal{N}(s_{k+1}, P_{k+1})$$

where $\mathcal{N}(\cdot)$ denotes a standard normal or Gaussian distribution for the predicted state variable $x_{k+1}$ at the next time step k+1.

Some embodiments are based on the realization that unscented Kalman filtering (UKF) can be used to compute an accurate propagation of the mean and the covariance than the explicit linearization-based propagation of the mean and the covariance, e.g., using extended Kalman filtering (EKF), for nonlinear system dynamics. Some embodiments are based on the realization that UKF is a special case of a general family of linear-regression Kalman filtering (LRKF), which is part of an even more general family of Gaussian-assumed density filters (ADF) that can be used in an implementation of the stochastic predictive controller for the vehicle 100 under uncertainty. ADFs use a statistical linearization, based on approximated matching of one and/or multiple higher order moment integrals, instead of an explicit linearization based on a Taylor series approximation (e.g., in the EKF). Therefore, the EKF is a first-order method based on explicit linearization to handle nonlinearities, while ADFs based on statistical linearization can achieve second or higher order of accuracy in the discrete-time or discretized propagation of the mean and the covariance through the nonlinear system dynamics.

Some embodiments are based on the realization that, for certain classes of problems, statistical linearization based on matching of one and/or multiple higher order moment integrals can be performed analytically, which further improves the accuracy of the propagation of the mean and the covariance and therefore further improves the performance of the stochastic predictive controller for the vehicle 100 under uncertainty.

The block diagram in FIG. 7B illustrates an example of one or multiple steps of a statistical linearization-based propagation of the mean and the covariance using ADFs, e.g., including a first propagation step 765, followed by a propagation step 770 and potentially one or multiple additional propagation steps 775. The propagation procedure is based on an initial state estimate $s_0 = \hat{x}_t$ and an initial state uncertainty 760, which can be represented by the covariance $\hat{P}_t$ and/or by its Cholesky factor $L_0^x = \text{chol}(\hat{P}_t)$ such that $\hat{P}_t = L_0^x L_0^{x^T}$ or $\hat{P}_t = L_0^{x^T} L_0^x$, using either a forward or reverse Cholesky factorization. Given the initial state estimate and corresponding uncertainty 760, and given the modeling uncertainty and/or (time-varying) disturbance $w_0 \sim \mathcal{N}(0, \Sigma_0)$ 761, for which $\Sigma_0 = L_0^w L_0^{w^T}$ or $\Sigma_0 = L_0^{w^T} L_0^w$ based on a Cholesky factorization, and given a set of one or multiple integration points and corresponding weights $$\mathcal{P} = \{\omega^{(i)}, \xi^{(i)}\}_{i=1}^{|\mathcal{P}|}$$

$\mathcal{P} = \{\omega^{(i)}, \xi^{(i)}\}_{i=1}^{|\mathcal{P}|}$ 762, the statistical linearization-based propagation equations can compute an approximation of the mean and the covariance, $s_1$ and $P_1 = L_1^x L_1^{x^T}$ at the next time step 765 as $$x_1^{(i)} = \phi(s_0 + L_0^X \xi_x^{(i)}, u_0, L_0^w \xi_w^{(i)}), \forall i \in \mathbb{Z}_1^{|\mathcal{P}|}$$

$$s_1 = \sum_{j=1}^{|\mathcal{P}|} \omega^{(i)} x_1^{(i)}$$

$$\mathcal{Y}_{1,i} = \sqrt{\omega_c^{(i)}} (x_1^{(i)} - s_1), \forall i \in \mathbb{Z}_1^{|\mathcal{P}|}$$

$$L_1^x = \text{chol}(\mathcal{Y}_1, \mathcal{Y}_1^T + \partial \mathbb{I}), P_1 = L_1^x L_1^{x^T} \succ 0$$

where function $\phi(s_k, u_k, w_k) = f(s_k, u_k + Ks_k, w_k)$ denotes pre-stabilized nonlinear system dynamics that are evaluated at each of the integration points $\xi^{(i)} = (\xi_x^{(i)}, \xi_w^{(i)})$ to compute state values $x_1^{(i)}$ for i=1,2, . . . , $|\mathcal{P}|$, matrix K denotes a feedback gain matrix and chol(•) represents a forward or reverse Cholesky factorization. Some embodiments are based on the realization that the computed state values $x_1^{(i)}$ for each of the integration points, together with the corresponding weight values $\omega^{(i)}$ for i=1,2, . . . , $|\mathcal{P}|$, can be used to compute an approximation of the mean and the covariance, i.e., $s_1 \approx \mathcal{N}[x_1]$ and $P_1 \approx \text{Cov}[x_1]$. In some embodiments, additional weight values $\omega_c^{(i)}$ are computed as $\omega_c^{(1)} = \omega^{(1)} + (1 - \gamma^2 + \beta)$ for a central integration point i=1 and given parameter values $\gamma$ and $\beta$, and $\omega_c^{(i)} = \omega^{(i)}$ corresponding to the remaining integration points i=2,3, . . . , $|\mathcal{P}|$.

Similarly, given the mean and the covariance $s_1$ and $P_1 = L_1^x L_1^{x^T}$ at one time step 765, and given the modeling uncertainty and/or (time-varying) disturbance $w_1 \sim \mathcal{N}(0, \Sigma_1)$ 771, for which $\Sigma_1 = L_1^w L_1^{w^T}$ or $\Sigma_1 = L_1^{w^T} L_1^w$ based on a Cholesky factorization, and given a set of one or multiple integration points and corresponding weights $$\mathcal{P} = \{\omega^{(i)}, \xi^{(i)}\}_{i=1}^{|\mathcal{P}|} 772,$$

the statistical linearization-based propagation equations can compute an approximation of the mean and the covariance information, $s_2$ and $P_2 = L_2^x L_2^{x^T}$ at the next time step 770 as $$x_2^{(i)} = \phi(s_1 + L_1^X \xi_x^{(i)}, u_1, L_1^w \xi_w^{(i)}), \; \forall \, i \in \mathbb{Z}_1^{|\mathcal{P}|}$$

$$s_2 = \sum_{i=1}^{|\mathcal{P}|} \omega^{(i)} x_2^{(i)}$$

$$\mathcal{Y}_{2,i} = \sqrt{\omega_c^{(i)}} \, (x_2^{(i)} - s_2), \;, \forall \, i \in \mathbb{Z}_1^{|\mathcal{P}|}$$

$$L_2^x = chol(\mathcal{Y}_2, \mathcal{Y}_2^T + \partial \mathbb{I}), \; P_2 = L_2^x L_2^{xT} \succ 0$$

Finally, one or multiple additional steps 775 can be performed in the discrete-time or discretized propagation of the mean and the covariance, using the statistical linearization-based propagation equations for the discrete-time or discretized nonlinear system dynamics of the vehicle 100 under uncertainty. In some embodiments, a different set of integration points and weights can be used in one or multiple steps of the statistical linearization-based propagation equations.

In some embodiments, the integration points, weights and parameter values can be chosen according to a spherical cubature (SC) rule to approximate the first and/or second order moment integrals, based on a set of $|\mathcal{P}|=2n=2(n_x+n_w)$ integration points $\Xi=[\xi^{(1)}, \xi^{(2)}, \ldots, \xi^{(2n)}]$ and weights $\Omega=[\omega^{(1)}, \omega^{(2)}, \ldots, \omega^{(2n)}]$ as follows $$\Xi = \sqrt{n} \, [\mathbb{I}_n \; -\mathbb{I}_n], \; \Omega = \frac{1}{2n} 1_{2n}^T,$$

where $n_x$ and $n_w$ denotes a number of state variables and disturbance variables in a controlled system (i.e., the vehicle 100), respectively, and $\mathbb{I}_n$ denotes n×n identity matrix, and $1_{2n}$ denotes a column vector of 2n elements that are equal to one. The SC rule does not include a central integration point, i.e., $\gamma=1$ and $\beta=0$, such that $\omega_c^{(i)}=\omega^{(i)}$ for each of the integration points $i=1,2, \ldots, |\mathcal{P}|$.

In some embodiments, the integration points, weights and parameter values can be chosen according to an unscented transform (UT) as used in the UKF to approximate the first and/or second order moment integrals, based on a set of $|\mathcal{P}|=2n+1=2(n_x+n_w)+1$ integration points $\Xi=[\xi^{(1)}, \xi^{(2)}, \ldots, \xi^{(2n+1)}]$ and weights $\Omega=[\omega^{(1)}, \omega^{(2)}, \ldots, \omega^{(2n+1)}]$ as follows $$\Xi = \sqrt{(n+\lambda)} \, [0_n \mathbb{I}_n \; -\mathbb{I}_n], \; \Omega = \frac{1}{\lambda+n} \left[\lambda \; \frac{1}{2} 1_{2n}^T \right],$$

where a parameter $\lambda=\gamma^2(n+\kappa)-n$ is defined based on a parameter value $\kappa$, and $\mathbb{I}_n$ denotes the n×n identity matrix, $0_n$ denotes a column vector of n elements that are equal to zero and $1_{2n}$ denotes a column vector of 2n elements that are equal to one. The UT rule does include a central integration point for which $\xi^{(1)}=0_n$ and $\omega_c^{(1)}=\omega^{(1)}+(1-\gamma^2+\beta)$. In some embodiments, the parameter values can be chosen, for example, as $$\gamma = \sqrt{\frac{3}{n}}, \; \beta = \frac{3}{n} - 1,$$

$\kappa=0$ such that $\lambda=\gamma^2(n+\kappa)-n=3-n$.

Figure 8A:
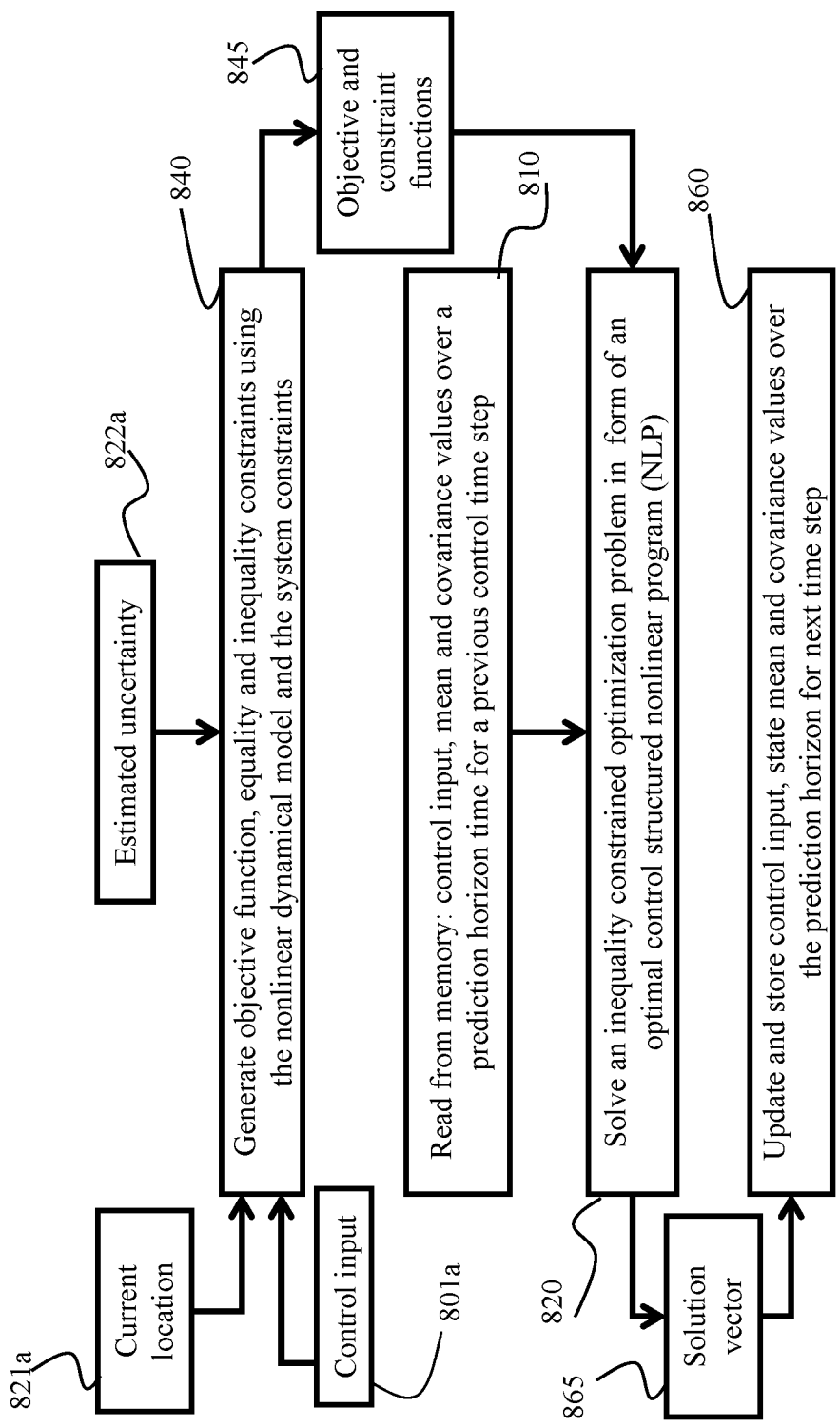
FIG. 8A shows a block diagram of a stochastic nonlinear model predictive control (SNMPC) to implement the stochastic control, according to some embodiments of the present disclosure.

FIG. 8A shows a block diagram of a stochastic nonlinear model predictive control (SNMPC) to implement the stochastic control 111, according to some embodiments of the present disclosure. Given a current probability of location 821 of the vehicle 821a, given an estimated uncertainty 822a, and a control input 801a, the processor 109 is configured to generate 840 an objective function, equality constraints and inequality constraints 845. Further, the processor 109 is configured to read 810 from memory (e.g., the memory 105) control input, mean and covariance values of the vehicle location over a prediction horizon time for a previous control time step. Further, the processor 109 is configured to solve 820 an inequality constrained optimization problem in form of an optimal control structured nonlinear program (NLP), to determine a control solution, e.g., a solution vector 865 that includes a sequence of future optimal or approximately optimal control commands over the prediction time horizon. The inequality constrained optimization problem is based on the generated objective function, the equality constraints and the inequality constraints 845. Further, the processor 109 is configured to control the vehicle 100 based on the solution vector 865.

Embodiments of the present disclosure use a direct optimal control method to formulate a continuous-time SNMPC problem as an inequality constrained nonlinear dynamic optimization problem. Some embodiments use a derivative-based optimization algorithm to solve the inequality constrained optimization problem either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments are based on the realization that the inequality constrained optimization problem has the form of the optimal control structured nonlinear program, such that a structure exploiting implementation of a derivative-based optimization algorithm can be used to compute the solution vector 865 at each control time step.

In some embodiments, the solution of the inequality constrained optimization problem uses the exact or approximate control inputs, vehicle location mean and/or covariance values over the prediction time horizon from the previous control time step, which can be read from the memory, as a solution guess in order to reduce computational effort of solving the inequality constrained optimization problem at the current control time step. This concept of computing a solution guess from the solution information at the previous control time step is called warm-starting or hot-starting of an optimization algorithm and it can reduce the required computational effort of the SNMPC. In a similar fashion, the corresponding solution vector 865 can be used to update and store 860 a sequence of exact or approximate control inputs, vehicle location mean and/or covariance values for the next control time step. In some embodiments, a time shifting procedure can be used, given the control inputs, the mean and/or covariance values over the prediction time horizon from the previous control time step, in order to compute an accurate solution guess for the inequality constrained optimization problem at the current control time step.

In some embodiments, the processor 109 solves a constrained optimal control structured nonlinear program (OCP-NLP) to determine the solution vector 865. Such an embodiment is described below in FIG. 8B.

Figure 8B:
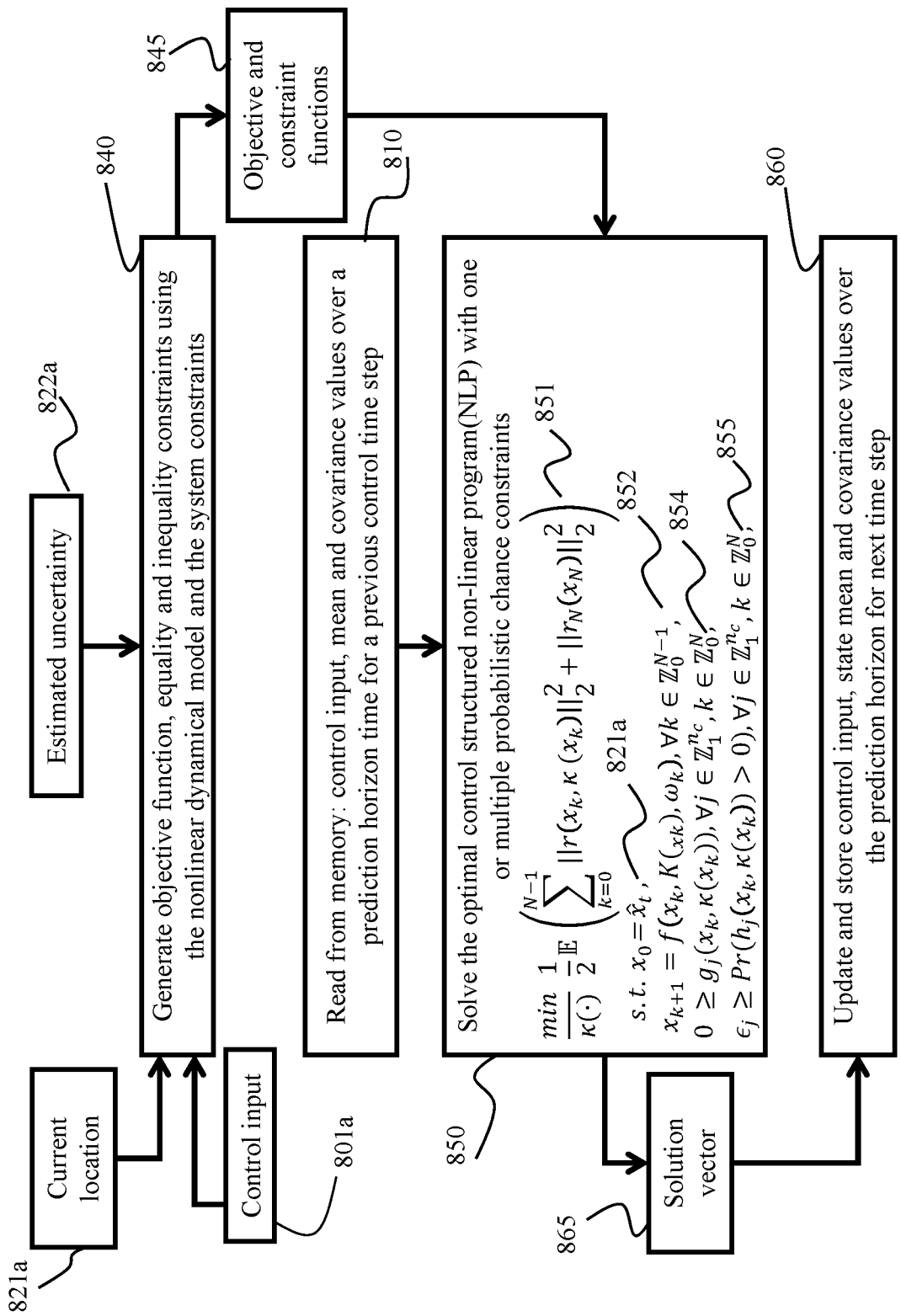
FIG. 8B shows a block diagram of an SNMPC that solves a constrained optimal control structured nonlinear program, using explicit linearization-based state mean and covariance propagation equations, according to some embodiments of the present disclosure.

FIG. 8B shows a block diagram of SNMPC that solves constrained OCP-NLP 850, according to some embodiments of the present disclosure. In some embodiments, the constrained OCP-NLP 850 directly optimizes a time-invariant or time-varying control policy function κ(•), which can be implemented as a state-feedback or as an output-feedback predictive controller for the vehicle 100 under uncertainty. In some embodiments, the constrained OCP-NLP 850 includes the state variables $x=[x_0, x_1, \ldots, x_N]$, where an initial state value can be defined based on the current state estimate $x_0 = \hat{x}_t$ 821a and future state values can be predicted based on nonlinear system dynamics f(•) in nonlinear equality constraints 852, depending on a control policy function κ(•) and the time-varying uncertainties and/or disturbances $w_k$ over the prediction time horizon $k=0,1,\ldots,N-1$.

In some embodiments, an objective function 851 for the constrained OCP-NLP 850 can correspond to a minimization of an expected value of a sum of linear and/or nonlinear least squares stage and/or terminal cost terms $\|r_k(\bullet)\|_2^2$ for $k=0,1,\ldots,N$ 851. In some embodiments, the objective function 851 can correspond to a minimization or maximization of the expected value or of a worst-case value for a smooth linear or nonlinear function of the control inputs, the vehicle location mean and/or covariance values over the prediction time horizon.

In some embodiments, the constrained OCP-NLP 850 can include one or multiple deterministic inequality constraints $0 \geq g_j(\bullet)$, $j=1,2,\ldots,n_c$ 854 that are defined by smooth linear and/or nonlinear functions $g_j( )$ of the control inputs, vehicle mean and/or covariance values over the prediction time horizon $k=0,1,\ldots,N$. Some embodiments are based on the realization that one or multiple of the deterministic inequality constraints 854 can be either convex or non-convex, which may affect the computational effort that is needed to solve the constrained OCP-NLP 850 at each control time step. In some embodiments, the constrained OCP-NLP 850 can include one or multiple probabilistic chance constraints $\epsilon_j \geq \Pr(h_j(\bullet)>0)$, $j=1,2,\ldots,n_h$ 855 that are defined by smooth linear and/or nonlinear functions $h_j( )$ of the control inputs, state mean and/or covariance values over the prediction time horizon $k=0,1,\ldots,N$. Some embodiments are based on the realization that each of the probabilistic chance constraints 855 aims to ensure that a probability of violating the corresponding inequality constraint is below a certain probability threshold value, i.e., $\epsilon_j \geq \Pr(h_j(\bullet)>0)$.

Figure 8C:
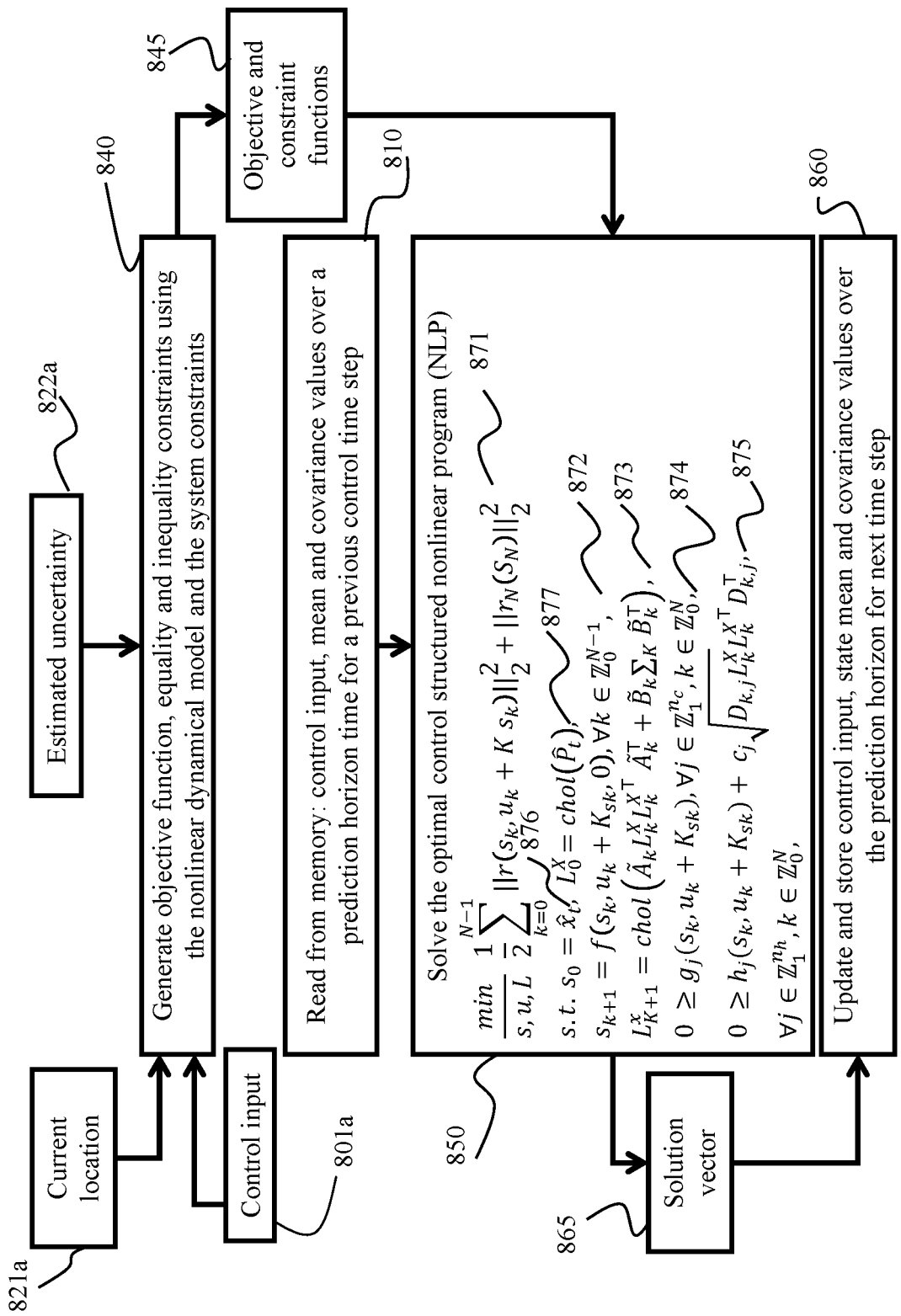
FIG. 8C shows a block diagram of an SNMPC that solves the constrained optimal control structured nonlinear programming problem, using explicit linearization-based state mean and covariance propagation equations, according to some embodiments of the present disclosure.

FIG. 8C shows a block diagram of an SNMPC controller that solves a constrained optimal control structured nonlinear programming problem (OCP-NLP) 870, using explicit linearization-based state mean and covariance propagation equations. The OCP-NLP 870 includes mean state variables $s=[s_0, s_1, \ldots, s_N]$, Cholesky factors of state covariance matrix variables $L=[L_0^x, L_1^x, \ldots, L_N^x]$ and control input variables $u=[u_0, u_1, \ldots, u_{N-1}]$ over the prediction time horizon as variables in the constrained optimization problem that needs to be solved at each control time step:

$$\min_{s, u, L} \frac{1}{2} \sum_{k=0}^{N-1} \|r(s_k, u_k + K s_k)\|_2^2 + \|r_N(s_N)\|_2^2$$

$$\text{s.t. } s_0 = \hat{x}_t, \ L_0^X = chol(\hat{P}_t),$$

$$s_{k+1} = f(s_k, u_k + K s_k, 0), \ \forall k \in \mathbb{Z}_0^{N-1},$$

$$L_{k+1}^x = chol\left(\tilde{A}_k L_k^X L_k^{x^T} \tilde{A}_k^T + \hat{B}_k \sum_K \hat{B}_k^T\right),$$

$$0 \geq g_j(s_k, u_k + K s_k), \ \forall j \in \mathbb{Z}_1^{n_c}, k \in \mathbb{Z}_0^N,$$

$$0 \geq h_j(s_k, u_k + K s_k) + c_j \sqrt{D_{k,j} L_k^X L_k^{X^T} D_{k,j}^T},$$

$$\forall j \in \mathbb{Z}_1^{n_h}, k \in \mathbb{Z}_0^N,$$

The OCP-NLP 870 includes a linear-quadratic or nonlinear objective function 871, e.g., based on a minimization of the expected value of a sum of linear and/or nonlinear least squares stage and/or terminal cost terms $\|r_k(\bullet)\|_2^2$ for $k=0,1,\ldots,N$ 871. Some embodiments are based on the current state estimate 821a in an initial mean vehicle value constraint $s_0 = \hat{x}_t$ 876, the current estimated state uncertainty in an initial state covariance constraint $L_0^x = chol(\hat{P}_t)$ 877, such that an initial vehicle location covariance reads as $P_0 = \hat{P}_t = L_0^x L_0^{x^T}$. Some embodiments are based on a dynamical model of the vehicle 100 that results in linear and/or nonlinear equality constraints 872 to compute the future mean state values over the prediction time horizon $s_1, \ldots, s_N$, and on an explicit linearization-based approximation of the uncertainty propagation through the system dynamics resulting in linear and/or nonlinear covariance propagation equations 873. In some embodiments, the covariance propagation equations 873 include a Cholesky factorization operator in order to compute the Cholesky factors for future state covariance matrices $L_1^x, \ldots, L_N^x$, such that $P_1 = L_1^x L_1^{x^T}, \ldots, P_N = L_N^x L_N^{x^T}$.

In some embodiments, the OCP-NLP 870 can include constraints on a combination of the control inputs, the vehicle location mean and covariance variables, resulting in one or multiple linear and/or nonlinear deterministic inequality constraints 874 that are defined by smooth linear and/or nonlinear functions $g_j( )$ over the prediction time horizon $k=0,1,\ldots,N$. In addition, the OCP-NLP 870 can include one or multiple probabilistic chance constraints $\epsilon_j \geq \Pr(h_j(\bullet)>0)$, $j=1,2,\ldots,n_h$ 855 that are defined by smooth linear and/or nonlinear functions $h_j( )$ of the control inputs, state mean and/or covariance values over the prediction time horizon $k=0,1,\ldots,N$. In some embodiments, the latter probabilistic chance constraints can be approximated by a constraint tightening reformulation as follows $$0 \geq h_j(s_k, u_k + K s_k) + c_j \sqrt{D_{k,j} L_k^X L_k^{X^T} D_{k,j}^T}$$

where a back-off coefficient value $c_j>0$ is computed based on a probability threshold value $\epsilon_j>0$, a matrix $$D_{k,j} = \frac{\partial h_j}{\partial x_k}$$

(•) is constraint Jacobian, based on Cholesky factors of the state covariance matrix variables $L=[L_0^x, L_1^x, \ldots, L_N^x]$ and resulting in additional linear and/or nonlinear tightened inequality constraints over the prediction time horizon $k=0, 1, \ldots, N$.

In some embodiments, the nonlinear equality constraints 872 $s_{k+1}=f(s_k, u_k+Ks_k, 0)$ impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, explicit or implicit Runge-Kutta methods, backward differentiation formulas or finite element methods. When the original dynamical model of the system (i.e., vehicle 100) is described by a set of continuous time differential equations, some embodiments discretize the system dynamics using an explicit or implicit numerical integration method 872 and the explicit linearization requires a corresponding Jacobian evaluation to construct discrete-time or discretized covariance propagation equations 873.

Figure 8D:
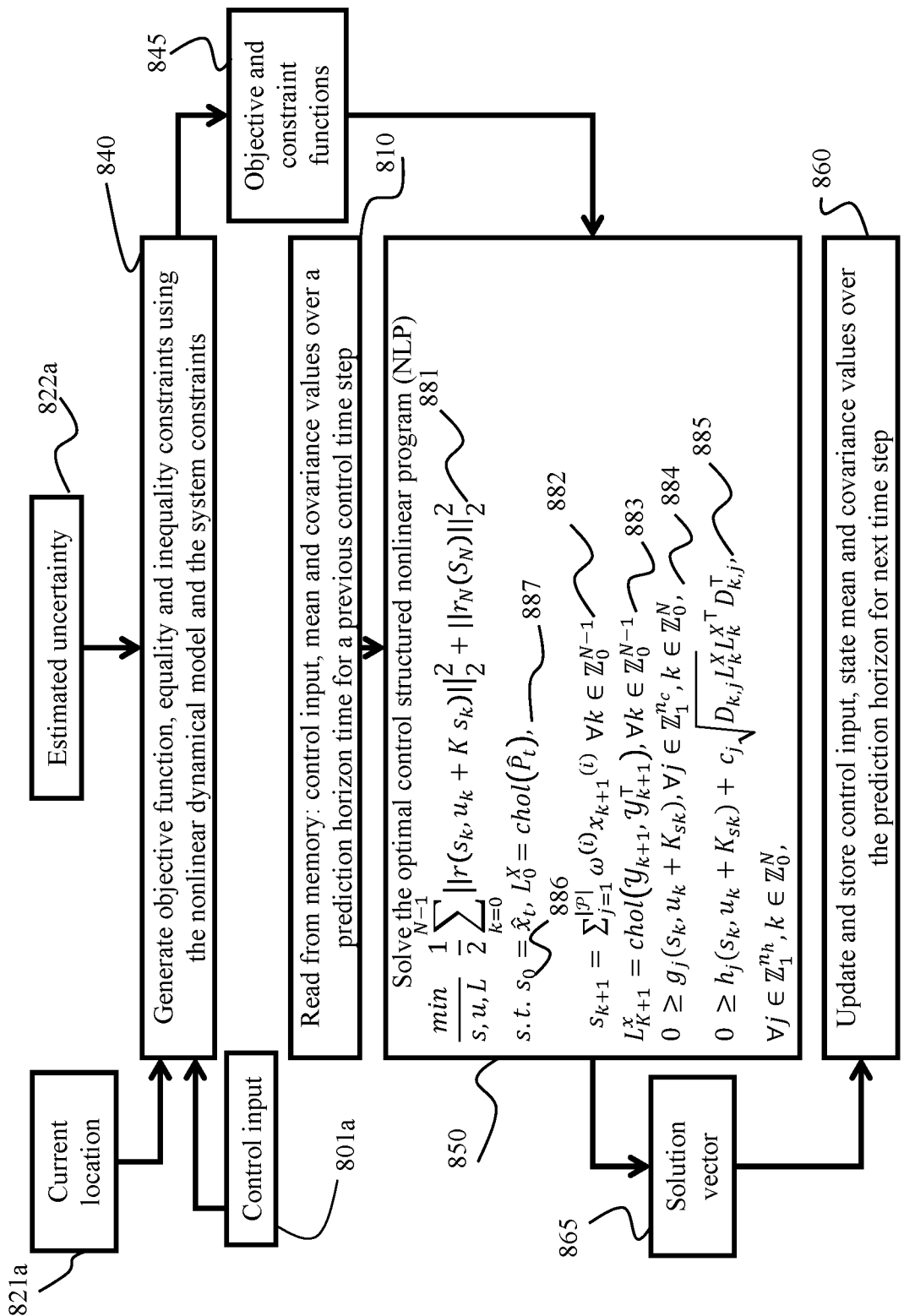

FIG. 8D shows a block diagram of an SNMPC that solves OCP-NLP 880, using statistical linearization-based state mean and covariance propagation (e.g., using unscented Kalman filter, linear-regression Kalman filter or assumed density filter-based filtering), according to some embodiments of the present disclosure. The OCP-NLP 880 includes the mean vehicle location variables $s=[s_0, s_1, \ldots, s_N]$, the Cholesky factors of the covariance matrix variables $L=[L_0^x, L_1^x, \ldots, L_N^x]$ and the control input variables $u=[u_0, u_1, \ldots, u_{N-1}]$ over the prediction time horizon as variables in the constrained optimization problem 850 that needs to be solved at each control time step:

$$\min_{s, u, L} \frac{1}{2} \sum_{k=0}^{N-1} \|r(s_k, u_k + K\ s_k)\|_2^2 + \|r_N(S_N)\|_2^2$$

$$\text{s.t. } s_0 = \hat{x}_t,\ L_0^x = chol(\hat{P}_t),$$

$$s_{k+1} = \sum_{j=1}^{|\mathcal{P}|} \omega^{(i)} x_{k+1}^{(i)} \quad \forall k \in \mathbb{Z}_0^{N-1}$$

$$L_{K+1}^x = chol(\mathcal{Y}_{k+1}, \mathcal{Y}_{k+1}^\top),\ \forall k \in \mathbb{Z}_0^{N-1}$$

$$0 \geq g_j(s_k, u_k + Ks_k),\ \forall\ j \in \mathbb{Z}_1^{n_c}, k \in \mathbb{Z}_0^N,$$

$$0 \geq h_j(s_k, u_k + Ks_k) + c_j\sqrt{D_{k,j}L_k^X L_k^{x^\top} D_{k,j}^\top},$$

$$\forall\ j \in \mathbb{Z}_1^{n_h}, k \in \mathbb{Z}_0^N$$

The OCP-NLP 880 includes a linear-quadratic or nonlinear objective function 881, e.g., based on a minimization of the expected value of a sum of linear and/or nonlinear least squares stage and/or terminal cost terms $\|r_k(\bullet)\|_2^2$ for $k=0,1,\ldots,N$ 881. Some embodiments are based on the current vehicle location estimate 821a in an initial mean state value constraint $s_0=\hat{x}_t$ 886, the current estimated state uncertainty in an initial state covariance constraint $L_0^x=chol(\hat{P}_t)$ 887, such that the initial state covariance reads as $P_0=\hat{P}_t=L_0^x L_0^{x^\top}$.

In some embodiments, an assumed density filter based filtering technique is used, e.g., based on the SC rule or the unscented transform (UT) in family of linear regression Kalman filters, to compute the state values $x_{k+1}^{(i)}$ at each of the integration points $\Xi=[\xi^{(1)}, \xi^{(2)}, \ldots, \xi^{(|\mathcal{P}|)}]$, where $\xi^{(i)}=(\xi_x^{(i)}, \xi_w^{(i)})$, and using the corresponding weights $\Omega=[\omega^{(1)}, \omega^{(2)}, \ldots, \omega^{(|\mathcal{P}|)}]$, as follows $$x_{k+1}^{(i)} = \phi\left(s_k + L_k^x\ \xi_x^{(i)}, u_k, L_k^w\ \xi_w^{(i)}\right) \text{ for } i = 1, 2, \ldots |\mathcal{P}|$$

$$Y_{k+1,i} = \sqrt{\omega_c^{(i)}}\left(x_{k+1}^{(i)} - s_{k+1}\right) \text{ for } i = 1, 2, \ldots |\mathcal{P}|$$

where $Y_{k+1,i}$ denotes $i^{th}$ column of the matrix $Y_{k+1}$ for each of the integration points $i=1,2,\ldots,|\mathcal{P}|$ over the prediction time horizon $k=0,1,\ldots,N-1$, and function $\phi(\bullet)$ denotes the pre-stabilized dynamical model of the vehicle 100 under uncertainty. The statistical linearization-based state mean and covariance propagation equations result in linear and/or nonlinear equality constraints 882 to compute the future mean state values over the prediction time horizon $s_1, \ldots, S_N$, and they result in linear and/or nonlinear covariance propagation equations 883, including a Cholesky factorization operator in order to compute the Cholesky factors for the future state covariance matrices $L_1^x, \ldots, L_N^x$.

In some embodiments, the OCP-NLP 880 includes constraints on a combination of the control inputs, the state mean and covariance variables, resulting in one or multiple linear and/or nonlinear deterministic inequality constraints 884 that are defined by smooth linear and/or nonlinear functions $g_j(\ )$ over the prediction time horizon $k=0,1,\ldots,N$. In addition, the constrained OCP-NLP can include one or multiple probabilistic chance constraints $\epsilon_j \geq \Pr(h_j(\bullet)>0), j=1, 2, \ldots, n_h$ 855 that are defined by smooth linear and/or nonlinear functions $h_j(\ )$ of the control inputs, state mean and/or covariance values over the prediction time horizon $k=0,1,\ldots,N$. In some embodiments, the latter probabilistic chance constraints can be approximated by a constraint tightening reformulation as follows $$0 \geq h_j(s_k, u_k + K\ s_k) + c_j\sqrt{D_{k,j}L_k^X L_k^{x^\top} D_{k,j}^\top}$$

where a back-off coefficient value $c_j>0$ is computed based on the probability threshold value $\epsilon_j>0$, the matrix $$D_{k,j} = \frac{\partial h_j}{\partial x_k}$$

$(\bullet)$ is the constraint Jacobian, based on Cholesky factors of the state covariance matrix variables $L=[L_0^x, L_1^x, \ldots, L_N^x]$ and resulting in the additional linear and/or nonlinear tightened inequality constraints 885 over the prediction time horizon $k=0,1,\ldots,N$.

Using an approximate formulation 875 or 885 of the probabilistic chance constraints 855, based on an individual tightening for each of the inequality constraints, the resulting inequality constrained nonlinear dynamic optimization problem can be solved using a Newton-type optimization algorithm that is based on successive linearization of optimality and feasibility conditions. Examples of such Newton-type optimization algorithms include interior point methods (IPM) and sequential quadratic programming (SQP). Some embodiments are based on the realization that an SQP algorithm solves a quadratic program (QP) approximation for stochastic nonlinear OCP at each iteration of SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

In some embodiments, a stage and/or terminal cost in the objective functions 851, 871 or 881 can be defined by any linear, linear-quadratic and/or nonlinear smooth function, including either convex and/or non-convex functions. The objective functions 851, 871 or 881 of the stochastic optimal control problem can include a cost term corresponding to each of time points of the prediction horizon time. In some embodiments, the objective function includes a (nonlinear) least-squares type penalization of a deviation of a certain output function of the vehicle 100 from a sequence of reference output values at each of the time points of the prediction time horizon, resulting in a reference tracking type formulation of the cost function in the stochastic control 111.

Examples of the uncertainty included in the SMPC can include the uncertainty of the probability of the current location, the uncertainty of the location itself, and an uncertainty of the probabilistic map 105*a*. The uncertainties can be defined as time-varying and uncertain disturbance variables in the direct optimal control problem formulation of a stochastic nonlinear model predictive controller.

Figure 9:
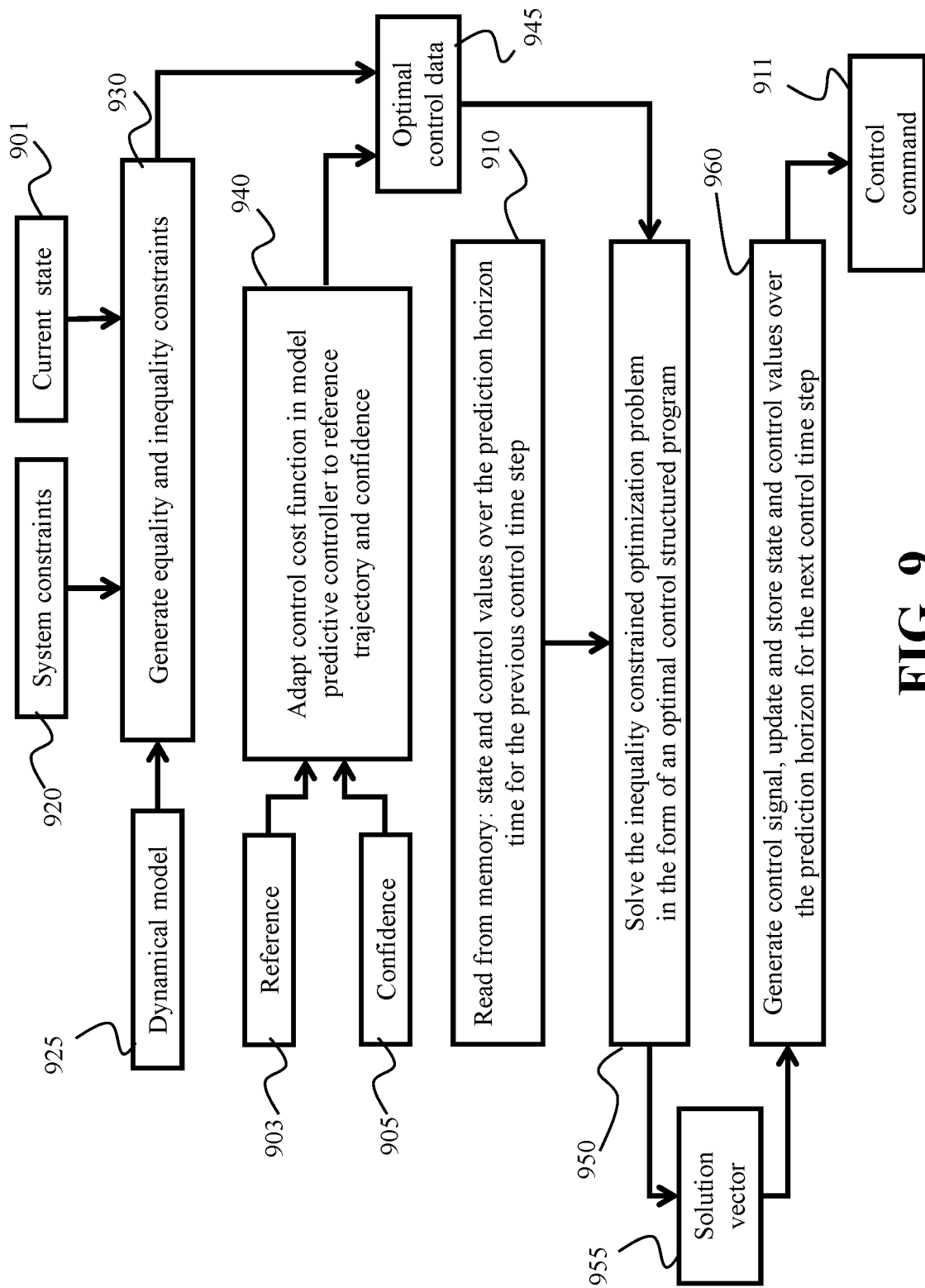
FIG. 9 shows a block diagram of an adaptive model predictive control (MPC) method that solves an inequality constrained optimization problem at each time step to implement the stochastic control, according to some embodiments of the present disclosure.

FIG. 9 shows a block diagram for a model predictive control (MPC) to implement the stochastic control 111 that computes control command 911, given a current state 901 of the vehicle 100 and a current control command, according to some embodiments. Specifically, MPC computes a control solution, e.g., a solution vector 955, that contains a sequence of future optimal control inputs over a prediction time horizon of the system 960, by solving an inequality constrained optimization problem in the form of an optimal control structured program 950 at each control time step. The optimal control data 945 of the objective function 940, equality and inequality constraints 930 in this optimization problem 950 depends on the dynamical model 925, the system constraints 920, the current state of the vehicle 100 and the control command that consists of a reference 903 and confidence 905.

In some embodiments, the solution of this inequality constrained optimization problem 950 uses the state and control values over the prediction time horizon from the previous control time step 910, which can be read from the memory. This concept is called warm-or hot-starting of the optimization algorithm and it can considerably reduce the required computational effort of the MPC controller in some embodiments. In a similar fashion, the corresponding solution vector 955 can be used to update and store a sequence of optimal or suboptimal state and control values for the next control time step 960.

Figure 10A:
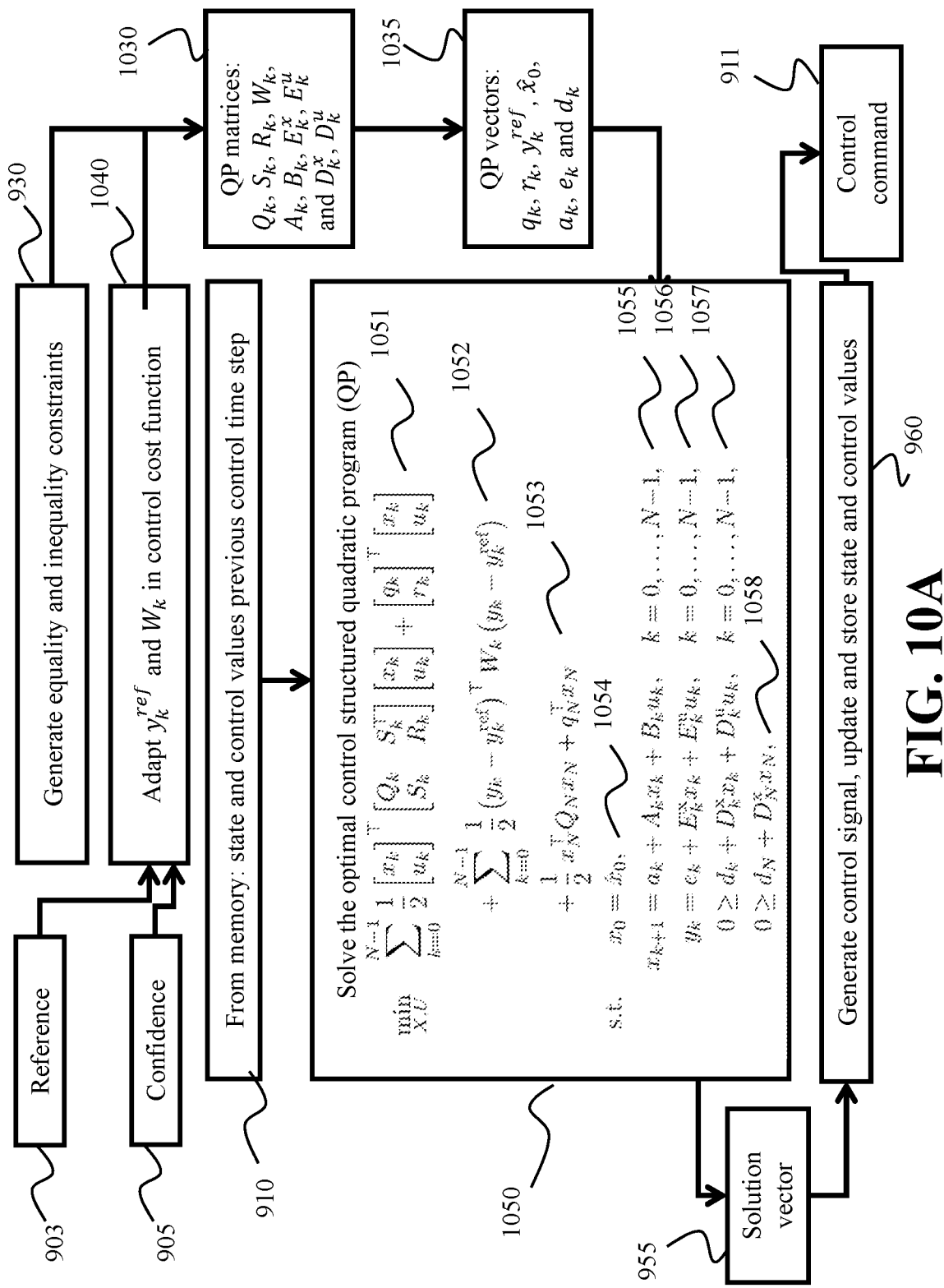
FIG. 10A is a block diagram of an adaptive MPC method that solves an optimal control structured quadratic program (QP), according to some embodiments of the present disclosure.

FIG. 10A shows a block diagram for an adaptive MPC controller to implement the stochastic controller 111 by solving an optimal control structured quadratic program (QP) 1050 to compute the control command 911, given the current state of the vehicle 100 and the control command. In some embodiments, the adaptive MPC controller uses a linear-quadratic objective function in combination with a linear dynamical model to predict the behavior of the vehicle and linear inequality constraints, resulting in an optimal control structured QP problem formulation that could read as $$\min_{X,U} \sum_{k=0}^{N-1} \frac{1}{2} \begin{bmatrix} x_k \\ u_k \end{bmatrix}^\top \begin{bmatrix} Q_k & S_k^\top \\ S_k & R_k \end{bmatrix} \begin{bmatrix} x_k \\ u_k \end{bmatrix} + \begin{bmatrix} q_k \\ r_k \end{bmatrix}^\top \begin{bmatrix} x_k \\ u_k \end{bmatrix} +$$

$$\sum_{k=0}^{N-1} \frac{1}{2} (y_k - y_k^{ref})^\top W_k (y_k - y_k^{ref}) + \frac{1}{2} x_N^\top Q_N x_N + q_N^\top x_N$$

s.t. $x_0 = \hat{x}_0,$
$x_{k+1} = a_k + A_k x_k + B_k u_k, \quad k = 0, \ldots, N-1,$
$y_k = e_k + E_k^x x_k + E_k^u u_k, \quad k = 0, \ldots, N-1,$
$0 \ge d_k + E_k^x x_k + D_k^u u_k, \quad k = 0, \ldots, N-1,$
$0 \ge d_N + D_N^x x_N,$ where the prediction horizon of the adaptive linear MPC controller is discretized in time, using a sequence of N equidistant or non-equidistant control intervals that are divided by a corresponding sequence of discrete time points $t_k$ for k=0, . . . , N. The optimization variables in the optimal control structured QP 1050 consist of state variables $x_k$ and control input variables $u_k$ for k=0, . . . , N. In some embodiments, the dimensions for the state and control variables do not need to be equal to each other for each discrete time point $t_k$ for k=0, . . . , N. At each sampling time for the adaptive MPC controller, the optimal control structured QP 1050 is formulated, using QP matrices 1030 and QP vectors 1035, and subsequently the QP is solved in order to compute the solution vector 955 to update the state and control trajectory 960 and generate a new control command 911.

The objective function in the constrained QP 1050 that is solved by the adaptive MPC controller includes one or multiple least squares reference tracking terms 1052, which penalize the difference between a sequence of predicted state and/or output values 1056 and a sequence of reference state.

In some embodiments, a sequence of weighting matrices $W_k$ is used in the least squares reference tracking terms 1052 for k=0, . . . , N, and each weighting matrix $W_k$ is adapted in the control cost function 1040 based on the reference 903 and confidence 905 that is computed by a probabilistic motion planner at each sampling instant. The weighting matrix $W_k$ is computed as a function of or is represented by the higher moments of the probabilistic distributions.

The output variables $y_k$ for k=0, . . . , N, which are used in the reference tracking objective term 1052, can be defined as any linear function of state and/or control input variables 1056. For example, the output function could include one or multiple combinations of one or multiple of longitudinal or lateral velocities and/or accelerations of the vehicle, a slip ratio or slip angle, angles of orientation or angular velocities, wheel speeds, forces and/or torques. The reference tracking objective term 1052 is defined by the weighting matrix $W_k$ in the QP matrices 1030 and the reference values $y_k^{ref}$ in the QP vectors 1035. In some embodiments, the weighting matrix is either positive definite $W_k > 0$ or positive semi-definite $W_k \ge 0$, i.e., all eigenvalues of the matrix $W_k$ are either larger than zero or all eigenvalues of the matrix $W_k$ are larger than or equal to zero.

In various embodiments, the penalty between the reference values determined by a motion planner and the values determined by the predictive controller is weighted by the weighting matrix that assigns different weights to different states variables of the target states. Additionally or alternatively, some embodiments add additional objective terms to be considered by the predictive controller. Examples of such additional terms can be related to driving comfort, speed limits, energy consumption, pollution, etc. These embodiments balance the cost of reference tracking with these additional objective terms.

For example, some embodiments define additional objective terms for the MPC cost function in the form of a linear-quadratic stage cost 1051 and/or a linear-quadratic terminal cost term 1053. These additional linear-quadratic objective terms, including the stage cost 1051 and terminal cost 1053, can include a linear and/or quadratic penalization of one or multiple combinations of one or multiple state and/or control input variables. For example, the objective function in the constrained QP 1050 could include a linear or quadratic penalization of longitudinal or lateral velocities and/or accelerations of the vehicle, a slip ratio or slip angle, angles of orientation or angular velocities, wheel speeds, forces, torques or any combination of such quantities. The linear-quadratic objective terms in the stage cost 1051 and the terminal cost 1053 are defined by the matrices $Q_k$, $S_k$ and $R_k$ in the QP matrices 1030 and the gradient values $q_k$, $r_k$ in the QP vectors 1035. In some embodiments, the Hessian matrix $$H_k = \begin{bmatrix} Q_k & S_k^T \\ S_k & R_k \end{bmatrix}$$

is either positive definite $H_k>0$ or positive semi-definite $H_k \geq 0$, i.e., all eigenvalues of the Hessian matrix $H_k$ are either larger than zero or all eigenvalues of the matrix $H_k$ are larger than or equal to zero.

In different embodiments, the optimal control is address with linear or non-linear control methods. For example, in one embodiment, the constrained optimal control structured QP 1050 that is solved by the adaptive linear MPC controller defines a linear dynamical model 1055 that describes the state of the vehicle at one time step $t_{k+1}$, given the state and control variables at the previous time step $t_k$. The linear dynamical model is defined by a time-invariant or time-varying sequence of matrices $A_k$ and $B_k$ in the QP matrices 1030 and vectors $a_k$ in the QP vectors 1035 for k=0, . . . , N−1. Given the current state estimate $\hat{x}_0$ in the equality constraint for the initial state value 1054 and a sequence of control input values $u_k$, the linear dynamical model equations 1055 can be used to compute the state values $x_k$ for k=0, . . . , N.

In addition to the equality constraints, including the initial value condition 1054, the dynamic equations 1055 and output equations 1056, the constrained optimal control structured QP 1050 can include one or multiple inequality constraints to impose physical limitations of the system, safety constraints and/or to impose desirable performance-related constraints on the behavior of the autonomous or semi-autonomous vehicle. More specifically, the QP can include path inequality constraints 1057 for k=0, . . . , N−1 and/or terminal inequality constraints 1058 at the end of the prediction horizon. The inequality constraints are defined by a time-invariant or time-varying sequence of matrices $D_k^x$ and $D_k^u$ in the QP matrices 1030 and vectors $d_k$ in the QP vectors 1035 for k=0, . . . , N.

The inequality constraints could include constraints on one or multiple combinations of one or multiple of longitudinal or lateral velocities and/or accelerations of the vehicle, the position and/or orientation of the vehicle with respect to its surroundings, a slip ratio or slip angle, angles of orientation or angular velocities, wheel speeds, forces and/or torques. For example, obstacle avoidance constraints could be implemented in the adaptive MPC controller by defining a set of one or multiple inequality constraints on a linear function of the predicted position, velocity and orientation of the vehicle with respect to the predicted position, velocity and orientation of one or multiple obstacles in the surrounding environment of the vehicle.

Some embodiments are based on the realization that the optimal control structured QP 1050 is convex if the Hessian matrix $H_k$ 1051, the terminal cost matrix $Q_N$ 1053 and the weighting matrix $W_k$ 1052 are positive definite or positive semi-definite. Embodiments can use an iterative optimization algorithm to solve the optimal control structured QP 1050 to find the solution vector 955, which is either feasible with respect to the constraints and globally optimal, feasible but suboptimal or an algorithm could find a low-precision approximate control solution that is neither feasible nor optimal. As part of the adaptive MPC controller, the optimization algorithm can be implemented in hardware or as a software program executed in a processor.

Examples of iterative optimization algorithms for solving the QP 1050 include primal or dual gradient-based methods, projected or proximal gradient methods, forward-backward splitting methods, alternating direction method of multipliers, primal, dual or primal-dual active-set methods, primal or primal-dual interior point methods or variants of such optimization algorithms. In some embodiments, the block-sparse optimal control structure in the QP matrices 1030 can be exploited in one or multiple of the linear algebra operations of the optimization algorithm in order to reduce the computational complexity and therefore to reduce the execution time and memory footprint of the QP optimization algorithm.

Other embodiments can solve a non-convex optimal control structured QP 1050 using optimization algorithms for nonlinear programming such as, for example, sequential quadratic programming (SQP) or interior point methods (IPM) that may either find a suboptimal, locally optimal or globally optimal control solution to the inequality constrained optimization problem at each sampling time of the adaptive MPC controller.

Figure 10B:
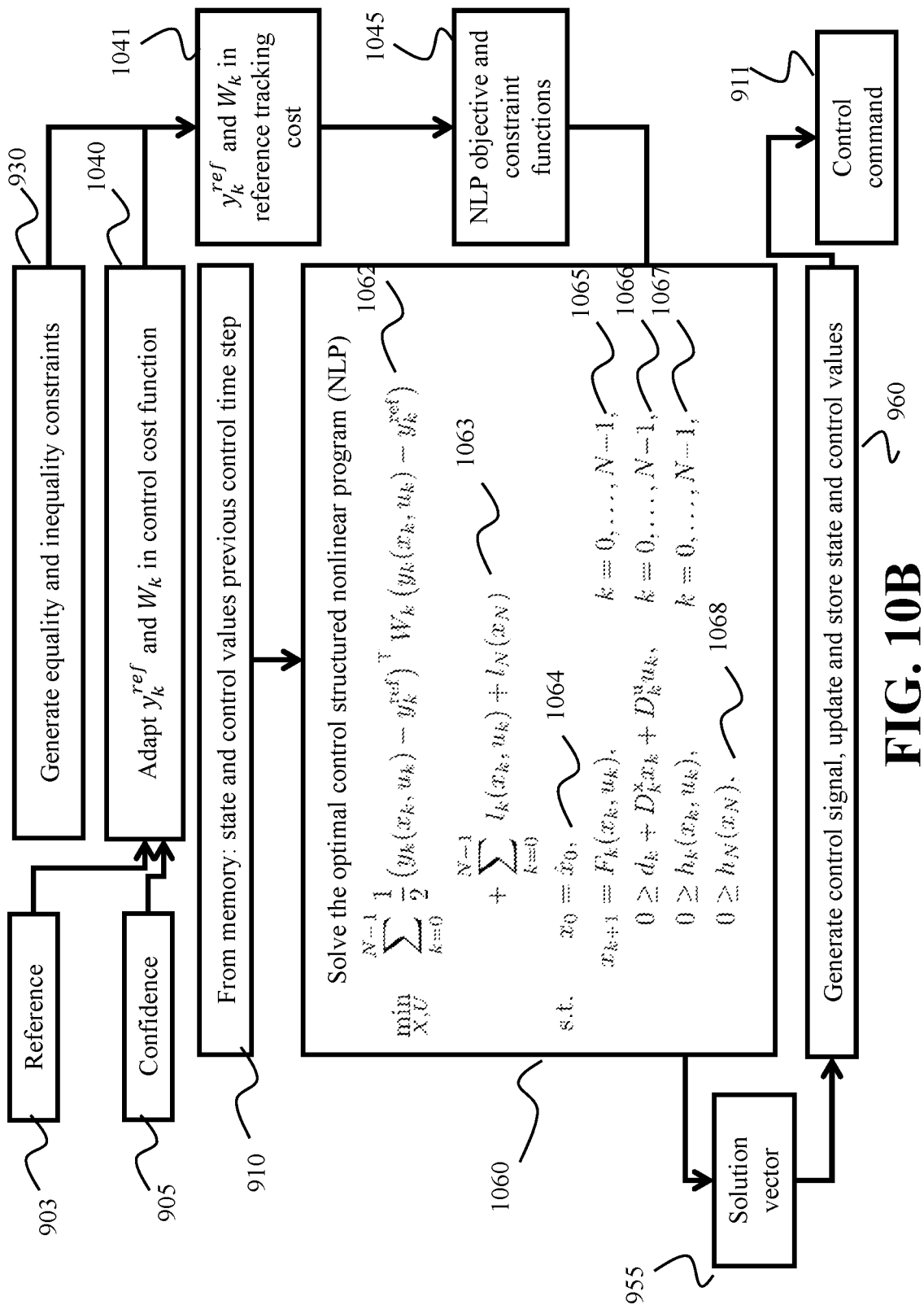
FIG. 10B is a block diagram of an adaptive MPC method that solves an optimal control structured nonlinear program (NLP), according to some embodiments of the present disclosure.

FIG. 10B shows a block diagram for adaptive MPC to implement the stochastic controller 111 by solving an optimal control structured nonlinear program (NLP) 1060 to compute the control command 911, given the current state of the vehicle 100 and the control command. In some embodiments, the adaptive MPC controller uses a linear-quadratic or nonlinear objective function in combination with a linear or nonlinear dynamical model to predict the behavior of the vehicle and a combination of linear and nonlinear inequality constraints, resulting in an optimal control structured NLP problem formulation that could read as $$\min_{X,U} \sum_{k=0}^{N-1} \frac{1}{2}\left(y_k(x_k, u_k) - y_k^{ref}\right)^\top W_k\left(y_k(x_k, u_k) - y_k^{ref}\right) +$$

$$\sum_{k=0}^{N-1} l_k(x_k, u_k) + l_N(x_N)$$

$$\begin{aligned}
\text{s.t.} \quad & x_0 = \hat{x}_0, \\
& x_{k+1} = F_k(x_k, u_k), && k = 0, \ldots, N-1, \\
& 0 \geq d_k + D_k^x x_k + D_k^u u_k, && k = 0, \ldots, N-1, \\
& 0 \geq h_k(x_k, u_k), && k = 0, \ldots, N-1, \\
& 0 \geq h_N(x_N),
\end{aligned}$$

where the prediction horizon of the adaptive nonlinear MPC controller is discretized in time, using a sequence of N equidistant or non-equidistant control intervals that are divided by a sequence of discrete time points $t_k$ for k=0, . . . , N. The optimization variables in the optimal control structured NLP 1060 consist of state variables $x_k$ and control input variables $u_k$ for k=0, . . . , N. In some embodiments, the dimensions for the state and control variables do not need to be equal to each other for each discrete time point $t_k$ for k=0, . . . , N. At each sampling time for the adaptive MPC controller, the optimal control structured NLP 1060 is formulated, using the reference and weighting matrix in the reference tracking cost 1041 and NLP objective and constraint functions 645, and the NLP is solved in order to compute the solution vector 955 to update the state and control trajectory 960 and generate a new control command 911.

The objective function in the constrained NLP 1060 that is solved by the adaptive MPC controller includes one or multiple linear and/or nonlinear least squares reference tracking terms 1062, which penalize the difference between a sequence of predicted state and/or output values and a sequence of reference state and/or output values 903 that is computed by the motion planner. In some embodiments, a sequence of weighting matrices $W_k$ is used in the least squares reference tracking terms 1062 for k=0, . . . , N, and each weighting matrix $W_k$ is adapted in the control cost function 1040 based on the reference 903 and confidence 905 that is computed by the probabilistic motion planner at each sampling instant. The output values $y_k(x_k, u_k)$ for k=0, . . . , N, which are used in the reference tracking objective term 1062, can be defined as any linear or nonlinear function of state and/or control input variables. For example, the output function could include one or multiple combinations of one or multiple of longitudinal or lateral velocities and/or accelerations of the vehicle, a slip ratio or slip angle, angles of orientation or angular velocities, wheel speeds, forces and/or torques. The reference tracking objective term 1062 is defined by the weighting matrix $W_k$ and the reference values $y_k^{ref}$ 1041. In some embodiments, the weighting matrix is either positive definite $W_k > 0$ or positive semi-definite $W_k \geq 0$, i.e., all eigenvalues of the matrix $W_k$ are either larger than zero or all eigenvalues of the matrix $W_k$ are larger than or equal to zero.

Embodiments can define additional objective terms for the MPC cost function in the form of a stage cost and/or a terminal cost term 1063, which can both consist of any combination of linear, linear-quadratic or nonlinear functions. These additional objective terms can include a penalization of one or multiple combinations of one or multiple linear or nonlinear functions of state and/or control input variables. For example, the objective function 645 in the constrained NLP 1060 could include a linear, quadratic or nonlinear penalization of longitudinal or lateral velocities and/or accelerations of the vehicle, a slip ratio or slip angle, angles of orientation or angular velocities, wheel speeds, forces, torques or any combination of such quantities.

The constrained optimal control structured NLP 1060 that is solved by the adaptive nonlinear MPC controller can define a nonlinear dynamical model 1065 that describes the state of the vehicle at one time step $t_{k+1}$, given the state and control variables at the previous time step $t_k$. The nonlinear dynamical model is defined by a time-invariant or time-varying function $x_{k+1} = F_k(x_k, u_k)$ for k=0, . . . , N−1. Given the current state estimate $\hat{x}_0$ in the equality constraint for the initial state value 1064 and a sequence of control input values $u_k$, the nonlinear dynamical model equations 1065 can be used to compute the state values $x_k$ for k=0, . . . , N.

Some embodiments are based on the realization that a discrete-time dynamical model 1065 to predict the behavior of the vehicle can be obtained by performing a time discretization of a set of continuous time differential or differential-algebraic equations. Such a time discretization can sometimes be performed analytically but generally requires the use of a numerical simulation routine to compute a numerical approximation of the discrete-time evolution of the state trajectory. Examples of numerical routines to approximately simulate a set of continuous time differential or differential-algebraic equations include explicit or implicit Runge-Kutta methods, explicit or implicit Euler, backward differentiation formulas and other single-or multistep methods.

In addition to the equality constraints, including the initial value condition 1064 and the dynamic equations 1065, the constrained optimal control structured NLP 1060 can include one or multiple linear and/or nonlinear inequality constraints to impose physical limitations of the system, safety constraints and/or to impose desirable performance-related constraints on the behavior of the autonomous or semi-autonomous vehicle. More specifically, the NLP can include linear path inequality constraints 1066 or nonlinear path inequality constraints 1067 for k=0, . . . , N−1 as well as linear and/or nonlinear terminal inequality constraints 1068 imposed at the end of the prediction horizon. The inequality constraints are defined by a time-invariant or time-varying sequence of matrices $D_k^x$, $D_k^u$, vectors $d_k$ and/or nonlinear functions $h_k(x_k, u_k)$ for k=0, . . . , N.

The inequality constraints could include constraints on one or multiple combinations of one or multiple of longitudinal or lateral velocities and/or accelerations of the vehicle, the position and/or orientation of the vehicle with respect to its surroundings, a slip ratio or slip angle, angles of orientation or angular velocities, wheel speeds, forces and/or torques. For example, obstacle avoidance constraints could be implemented in the adaptive nonlinear MPC controller by defining a set of one or multiple inequality constraints on a linear or nonlinear function of the predicted position, velocity and orientation of the vehicle with respect to the predicted position, velocity and orientation of one or multiple obstacles in the surrounding environment of the vehicle.

In some embodiments, the adaptive nonlinear MPC controller includes obstacle avoidance constraints that are implemented using a time-varying sequence of one or multiple ellipsoidal inequality constraints that could read as $$1 \leq \left(\frac{\delta_{x,j}(t)}{a_{x,j}}\right)^2 + \left(\frac{\delta_{y,j}(t)}{a_{y,j}}\right)^2$$

$$\text{where } \begin{bmatrix} \delta_{x,j} \\ \delta_{y,j} \end{bmatrix} = R(e_{\psi,j})^T \begin{bmatrix} p_X - e_{x,j} \\ p_Y - e_{y,j} \end{bmatrix}$$

is the rotated distance of the estimated or predicted vehicle position $(p_X, p_Y)$ to the estimated and/or predicted position of one of potentially multiple obstacles in the surrounding environment of the vehicle. The position and orientation of each obstacle is denoted by $(e_{x,j}, e_{y,j}, e_{\psi,j})$, the matrix $R(e_{\psi,j})^T$ denotes the transpose of the rotation matrix corresponding to the angle $e_{\psi,j}$ that represents the orientation of the obstacle, and $(a_{x,j}, a_{y,j})$ denotes the lengths of the principal semi-axes of the ellipsoid that defines the safety margin, including uncertainty around the spatial extent of the estimated shape, around each of the M nearest detected obstacles for j=1, . . . , M. The real-time obstacle detection and corresponding pose estimation can be performed by a sensing module and this information is shared by the different components in the multi-layer vehicle control architecture.

Some embodiments are based on tailored optimization algorithms to efficiently solve the constrained optimal control structured NLP 1060 at each sampling instant of the nonlinear adaptive MPC controller. Such an optimization algorithm can find a solution vector 955, which is either feasible with respect to the constraints and globally optimal, feasible but locally optimal, feasible but suboptimal or an iterative optimization algorithm could find a low-precision approximate control solution that is neither feasible nor locally optimal. Examples of NLP optimization algorithms include variants of interior point methods and variants of sequential quadratic programming (SQP) methods.

In particular, some embodiments use the real-time iteration (RTI) algorithm that is an online variant of sequential quadratic programming in combination with a quasi-Newton or generalized Gauss-Newton type positive semi-definite Hessian approximation such that at least one convex block-sparse QP approximation needs to be solved at each sampling instant of the nonlinear MPC controller. Each RTI iteration consists of two steps:

(1) Preparation phase: discretize and linearize the system dynamics, linearize the remaining constraint functions, and evaluate the quadratic objective approximation to build the optimal control structured QP subproblem.

(2) Feedback phase: solve the QP to update the current values for all optimization variables and obtain the next control input to apply feedback to the system.

In some embodiments, the block-sparse optimal control structure in the Hessian and constraint Jacobian matrices can be exploited in one or multiple of the linear algebra operations of the optimization algorithm in order to reduce the computational complexity and therefore to reduce the execution time and memory footprint of the NLP optimization algorithm.

Figure 11A:
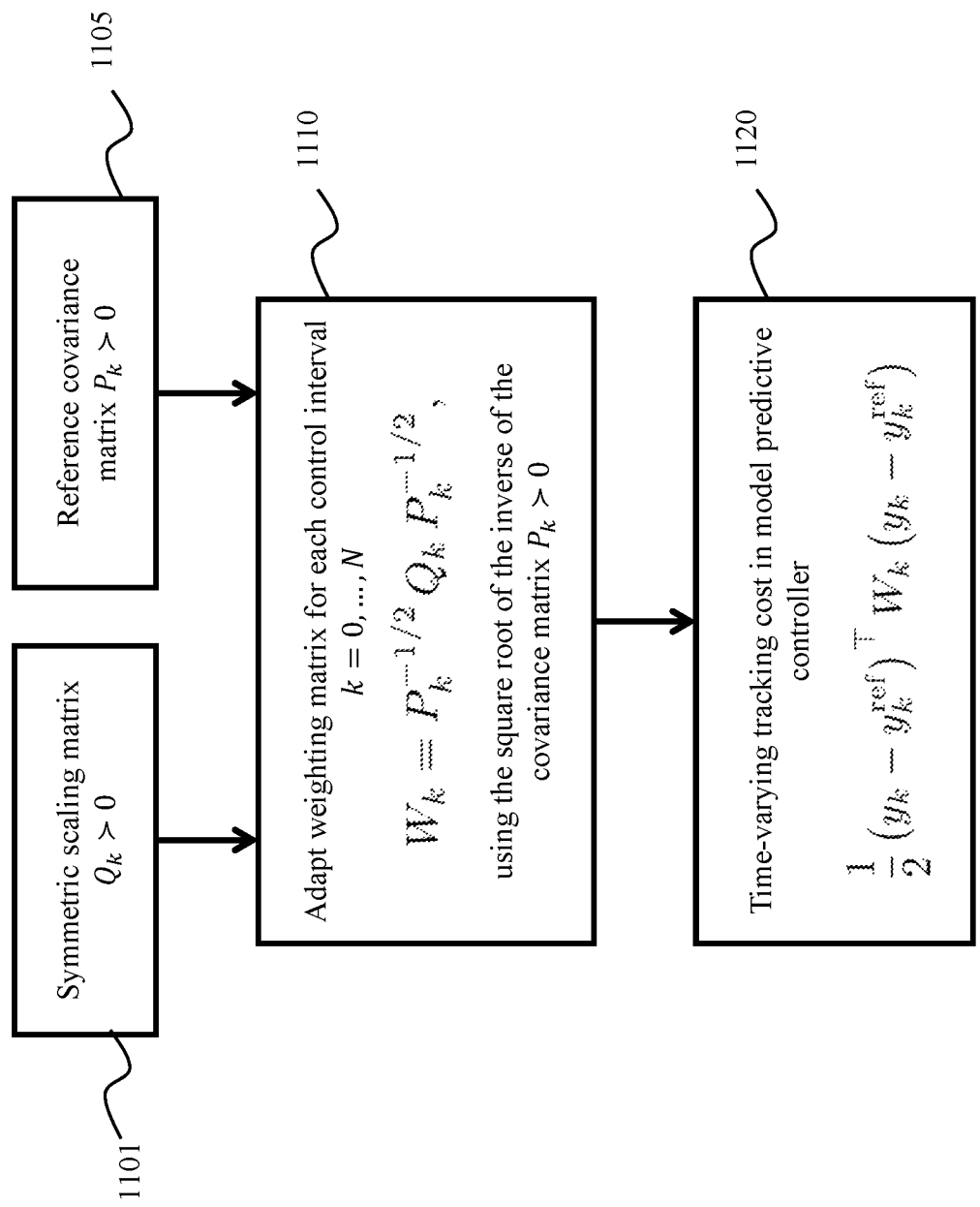
FIG. 11A is a block diagram of a method to adapt a reference and a weighting matrix for a time-varying reference tracking cost in an adaptive linear or nonlinear MPC controller, according to some embodiments of the present disclosure.

FIG. 11A shows a block diagram of a method to adapt the reference and weighting matrix 1040 in a particular embodiment of the time-varying reference tracking cost 1120 in the adaptive linear or nonlinear MPC controller. The MPC tracking cost 1120 is weighted with time-varying positive definite or positive semi-definite weighting matrices 1110 and each of the weighting matrices is computed based on an inverse proportional relation to the time-varying uncertainty around the reference that is computed by the probabilistic motion planner, represented by a combination of one or multiple of the higher order moments of the parametric probability distributions.

In some embodiments, the MPC uses time-varying positive definite or positive semi-definite weighting matrices in the tracking cost that are computed as a stage-wise scaled inverse of the sequence of covariance matrices 1105 of the parametric probability distributions from the probabilistic motion planner. The sequence of covariance matrices 1105 represent or include high order moments of the probabilistic distributions determined by the motion planner. The motion planner weights the different control objectives in relation to their respective importance, to produce a suitable sequence of state and/or output values and probability distributions for 1045 the MPC to control the vehicle. Given a covariance matrix $P_k>0$ corresponding to each reference state and/or output value, the weighting matrix in the adaptive linear or nonlinear MPC controller could be computed as follows $$W_k = P_k^{-1/2} Q_k P_k^{-1/2},$$

where $W_k$ denotes the weighting matrix in the MPC reference tracking cost 1120, the matrix $P_k$ denotes the covariance matrix 1105 and $Q_k>0$ is a symmetric and positive definite scaling matrix 1101. The scaling matrix $Q_k$ can be chosen as a time-invariant or a time-varying sequence of symmetric and positive definite matrices, in which each scaling matrix is either a dense or diagonal matrix. In some embodiments, the scaling matrix is chosen in accordance with the relative scaling of the different control objectives by the probabilistic motion planner in relation to their respective importance.

In FIG. 11A, the weighting matrix for each control interval k=0, ..., N is computed using the square root of the inverse of the covariance matrix $P_k^{-1/2}$. In some embodiments, the weighting matrix in the adaptive linear or nonlinear MPC controller could alternatively be computed as follows $$W_k = L_k^{-T} Q_k L_k^{-1}$$

where $L_k$ denotes the Cholesky factor of the positive definite covariance matrix $P_k>0$ such that $P_k = L_k L_k^T$ and $P_k^{-1} = L_k^{-T} L_k^{-1}$. Some embodiments are based on the realization that the weighting matrix $W_k = L_k^{-T} Q_k L_k^{-1}$ can be computed efficiently based on a Cholesky factorization of the positive definite covariance matrix $P_k = L_k L_k^T$ and a Cholesky factorization of the positive definite scaling matrix $Q_k = R_k R_k^T$, such that the intermediate matrix $X_k = L_k^{-T} R_k$ can be computed efficiently using forward or backward substitutions and the symmetric weighting matrix can be computed subsequently as $W_k = X_k X_k^T$.

Figure 11B:
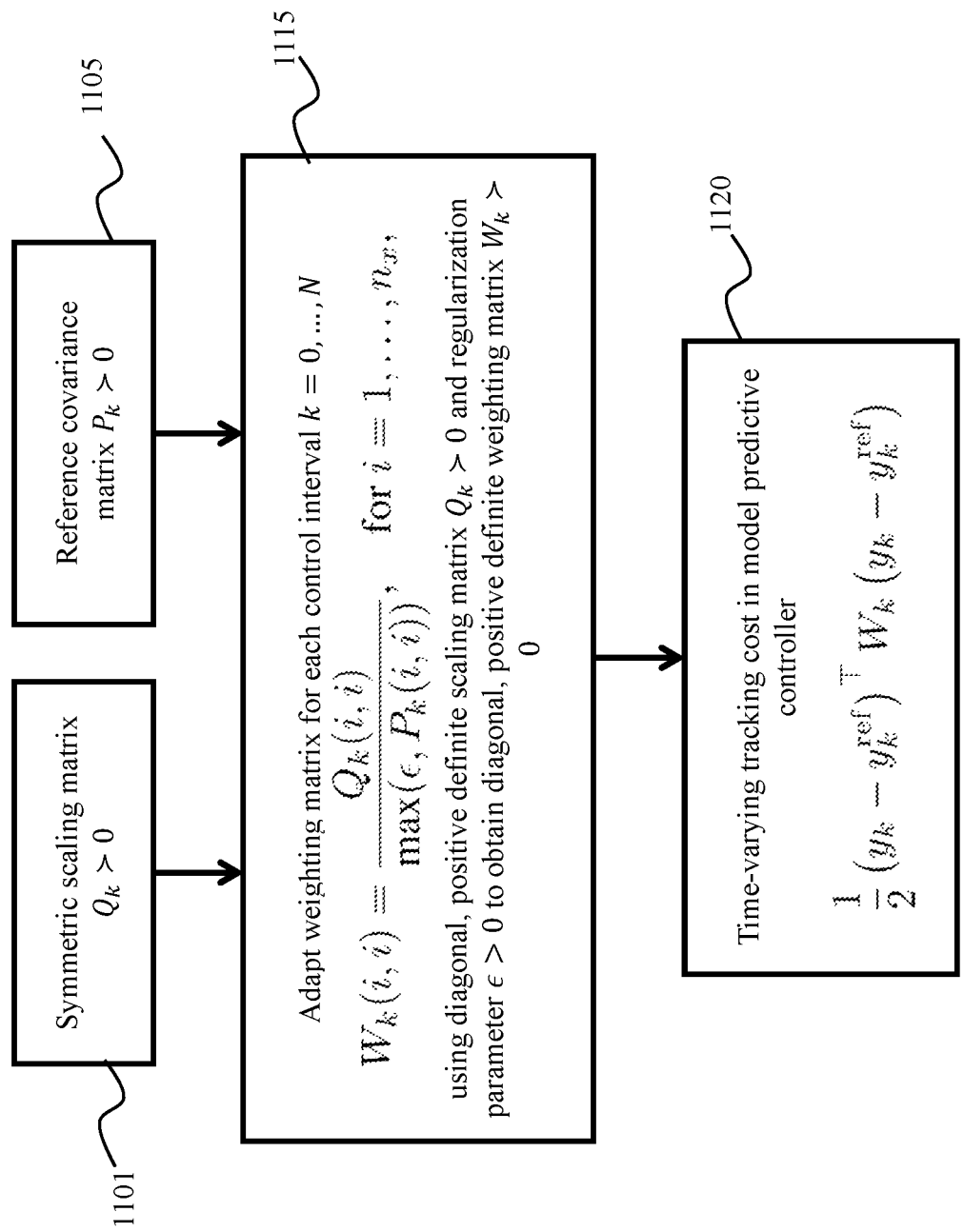
FIG. 11B is a block diagram of a method to adapt a reference and a diagonal weighting matrix for the time-varying reference tracking cost in an adaptive linear or nonlinear MPC controller, according to some embodiments of the present disclosure.

FIG. 11B shows a block diagram of a method to adapt the reference and weighting matrix 1040 in a particular embodiment of the time-varying reference tracking cost 1120 in the adaptive linear or nonlinear MPC controller, based on a diagonal positive definite weighting matrix $W_k>0$ 1115 where each of the diagonal entries can be computed individually $$W_k(i,i) = \frac{Q_k(i,i)}{\max(\epsilon, P_k(i,i))}, \text{ for } i = 1, \ldots, n_x,$$

using only the corresponding diagonal entries of the positive definite scaling matrix $Q_k>0$ 1101 and the corresponding diagonal entries of each reference covariance matrix $P_k>0$ 1105. In some embodiments, one or multiple saturation functions can be used to improve the numerical conditioning of the constrained optimization problem that is solved by the MPC, for example, based on a regularization parameter $\epsilon>0$ in order to be able to provide lower and upper bounds for each of the time-varying positive-definite weighting matrices in the reference tracking cost of the adaptive MPC controller. Such a representation of weighting matrices as diagonal matrices is computationally cheaper.

FIG. 11C illustrates an algorithm for automatic tuning of the time-varying reference tracking cost of the adaptive MPC controller 940, using higher order moments from the probabilistic motion planner, according to some embodiments. Based on the sequence of reference state and/or output values and corresponding covariance matrices 1140, a smooth approximation of the reference motion 1143 can be used in the least squares type objective term of the MPC controller and each of the weighting matrices can be computed individually based on an inverse proportional relation with each of the corresponding covariance matrices 730 from the probabilistic motion planner, which is repeated at each sampling instant of the MPC controller 1144. If a new reference motion plan is computed 1141 by the probabilistic motion planner, consisting of first and higher order moments of the parametric probability distributions, the sequence of reference state and/or output values and corresponding covariance matrices can be reset 1142. If a new reference motion plan is not yet available, the most up to date sequence of reference state and/or output values and corresponding covariance matrices can be shifted from one control time step to the next.

Some embodiments are based on the realization that the motion planner acts on a longer time scale than the MPC, while the MPC controller can execute at a higher sampling rate than the motion planner, such that the MPC can adjust more quickly to environmental changes and to uncertainties in the sensing and estimation of the vehicle state as well as of the surroundings of the vehicle, compared to the relatively low reactivity of the motion planner.

In some embodiments, the vehicle 101 is desired to perform a task of reaching target location. To that end, the processor 109 is configured to control movement of the vehicle 100 from the current location to the target location along a trajectory defining a sequence of locations, as described below in FIG. 9.

Figure 12:
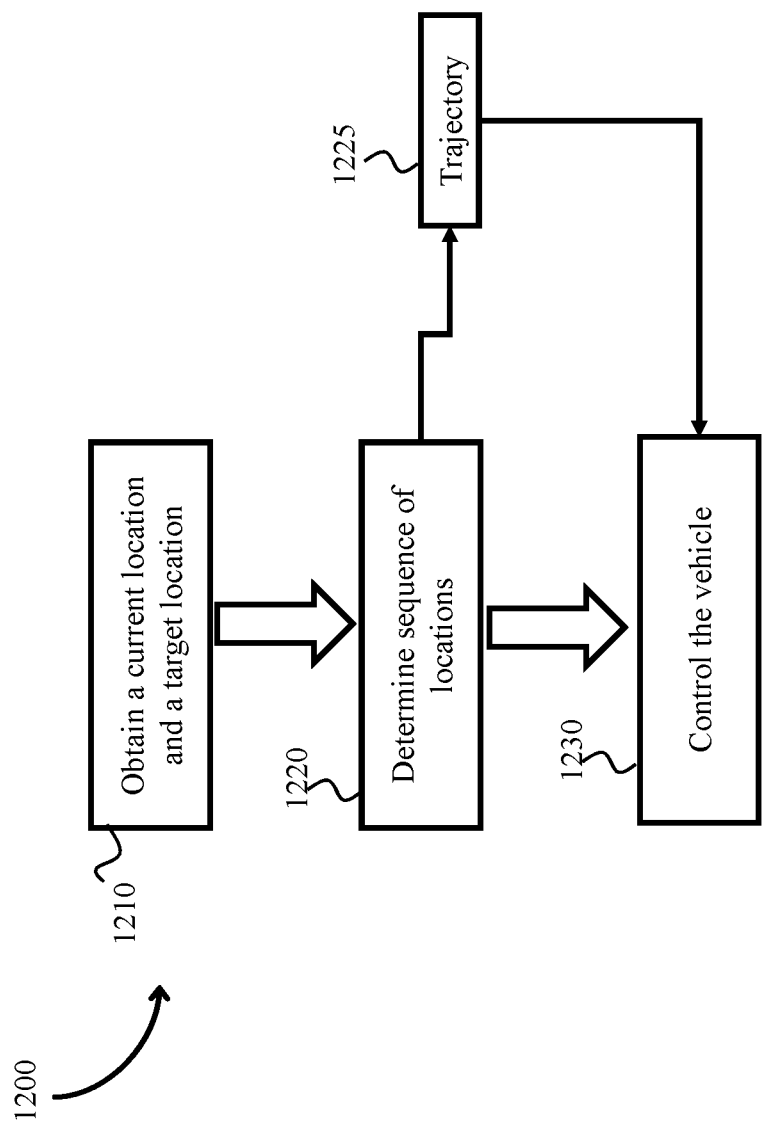
FIG. 12 shows a flowchart of a method for controlling movement of the vehicle, according to some embodiments of the present disclosure.

FIG. 12 shows a flowchart of a method 1200 for controlling the movement of the vehicle 100, according to some embodiments. At block 1210 of the method 1200, the processor 109 is configured to obtain 1210 the current location of the vehicle 100 and a target location of the vehicle 100. Next, based on the current location and the target location, at block 1220 of the method 1200, the processor 109 is configured to determine 1220 a sequence of locations defining a reference trajectory 1225 for the vehicle 100 to follow. At block 1230 of the method 1200, the processor 109 is configured to control 1230 the movement of the vehicle 100 to move along the trajectory 1225.

In some embodiments, the processor 109 is further configured to determine the sequence of locations to optimize a cumulative certainty of estimation of the locations in the sequence of locations. For instance, the sequence of locations is determined to reach the target location along the trajectory leading to the most certain locations in the environment. For instance, the sequence of locations is determined to reach the target location while exploring previously highly uncertain locations. One embodiment optimizes the sequence of locations by solving an optimal control problem, e.g., in a form of a stochastic model predictive control, wherein a cost function includes a term optimizing time of arrival, a term minimizing the uncertainty of locations from the current location to the target location, and a term minimizing a path length.

In some embodiments, the cumulative certainty of estimation of the locations in the sequence of locations is defined by a sum of the timestamps associated with the locations in the optimized sequence of locations. This can be beneficial, e.g., when there is a large time varying component in the magnetic field that causes an uncertainty to increase with time.

In one embodiment, the processor 109 is further configured to maximize the sum of the timestamps to increase the certainty of trajectory estimation and control. In another embodiment. In another embodiment, the processor 109 is further configured to minimize the sum of the timestamps to explore the environment while performing the task. One embodiment maximizes the sum of the timestamps by including such cost in the objective function of the optimization problem. I.e., the optimization problem is a maximization problem. Another embodiment acknowledges that only optimizing the arrival time can lead to undesired behavior. Consequently, one embodiment combines a maximization of an arrival time subject to a maximum time of arrival formulated as a constraint. Another embodiment combines a maximization of an arrival time subject to a minimization of exploration of the space in the vicinity of the straight-line segment from initial point to final point.

In another embodiment, the processor 109 is further configured to minimize the sum of the timestamps to explore the environment while performing the task. One embodiment minimizes the sum of the timestamps by minimizing the time of arrival in the cost function. Another embodiment combines a minimization of an arrival time subject to a maximization of exploration of the space in the vicinity of the straight-line segment from initial point to final point.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A vehicle, comprising:
an actuator configured to change a current location of the vehicle in an environment;
a magnetometer configured to measure a magnetic field based on the current location of the vehicle;
a memory configured to store a probabilistic map of the environment relating measurements of the magnetic field and time of the measurements of the magnetic field to a probability of locations within the environment;

a clock configured to timestamp the measurements of the magnetometer; and a processor configured to:
estimate a probability of the current location in the environment based on a current measurement of the magnetometer at a current timestamp by submitting the current measurement and the current timestamp to the probabilistic map; and
control the actuator based on a stochastic control employing the probability of the current location.

2. The vehicle of claim 1, wherein the probabilistic map includes a magnetic field function relating the measurements of the magnetic field to locations where the measurements of the magnetic field measurements are taken.

3. The vehicle of claim 2, wherein the magnetic field function maintains timestamps of different locations and returns, upon submitting the measurements, the location, and the timestamp associated with the submitted measurements.

4. The vehicle of claim 3, wherein the probabilistic map produces a mean of the location based on the location returned by the magnetic field function and produces a variance of the location based on a difference between the current timestamp and the timestamp returned by the magnetic field function.

5. The vehicle of claim 1, wherein the probabilistic map includes a probabilistic function of a map of the environment that maintains timestamps of different locations, wherein the probabilistic function includes time-varying uncertainty defined by a difference between the current timestamp and a timestamp associated with the current location.

6. The vehicle of claim 1, wherein the processor is further configured to perform a joint localization of the vehicle and mapping of the magnetic field based on the current measurement of the magnetometer and the current timestamp to produce the probabilistic map with time-varying uncertainty.

7. The vehicle of claim 6, wherein the processor is further configured to update the probabilistic map based on the current measurements of the magnetic field and updates the time-varying uncertainty associated with the current location based on the current timestamp.

8. The vehicle of claim 6, wherein the probabilistic map includes a probabilistic function of a map of the environment that maintains timestamps of different locations, wherein the probabilistic function includes the time-varying uncertainty defined by a difference between the current timestamp and a timestamp associated with the current location, and wherein the processor updates the timestamp of the probabilistic function associated with the current location based on the current timestamp.

9. The vehicle of claim 1, wherein the probabilistic map includes a magnetic field function relating the measurements of the magnetic field to locations where the measurements of the magnetic field measurements are taken, and wherein the processor is further configured to determine a location of the vehicle by submitting the measurements of the magnetic field and associated timestamps to an inverse of the magnetic field function.

10. The vehicle of claim 9, wherein the processor is further configured to determine the magnetic field function and the location of the vehicle by executing a probabilistic filter.

11. The vehicle of claim 9, wherein the probabilistic filter is one of a particle filter and a Kalman filter.

12. The vehicle of claim 9, wherein magnetic field function is modeled as a time-varying Gaussian process represented as a weighted combination of basis functions, and wherein weights of the basis functions are distributed according to a Gaussian distribution.

13. The vehicle of claim 1, wherein an uncertainty of the probability of the current location is included in a formulation of the stochastic control.

14. The vehicle of claim 1, wherein the processor, to perform the stochastic control, is further configured to execute a nonlinear stochastic model-predictive controller (SMPC) to produce a control command and submit the control command to the actuator.

15. The vehicle of claim 1, wherein the stochastic control is a model predictive controller (MPC) optimizing a cost function using a constrained optimization subject to constraints selected based on control objectives.

16. The vehicle of claim 1, wherein the processor is further configured to control the movement of the vehicle from the current location to a target location along a trajectory defining a sequence of locations, wherein the processor is further configured to determine the sequence of locations to optimize a cumulative certainty of estimation of the locations in the sequence of locations.

17. The vehicle of claim 16, wherein the cumulative certainty of estimation of the locations in the sequence of locations is defined by a sum of the timestamps associated with the locations in the optimized sequence of locations.

18. The vehicle of claim 17, wherein the processor is further configured to maximize the sum of the timestamps to increase the certainty of trajectory estimation and control.

19. The vehicle of claim 17, wherein the processor is further configured to minimize the sum of the timestamps to explore the environment while performing a task.

20. A method for controlling a vehicle in an environment, wherein the method uses a processor coupled to a memory storing a probabilistic map of the environment relating measurements of a magnetic field and time of the measurements of the magnetic field to a probability of locations within the environment, the processor is coupled with stored instructions when executed by the processor carry out steps of the method, comprising:
estimating a probability of the current location in the environment based on a current measurement of a magnetometer at a current timestamp by submitting the current measurement and the current timestamp to the probabilistic map; and
controlling an actuator of the vehicle based on a stochastic control employing the probability of the current location.

21. A non-transitory computer readable storage medium embodied thereon a program executable by a processor for performing a method for controlling a vehicle in an environment, the storage medium stores a probabilistic map of the environment relating measurements of a magnetic field and time of the measurements of the magnetic field to a probability of locations within the environment, the program when executed by the processor carry out steps of the method, comprising:
estimating a probability of the current location in the environment based on a current measurement of a magnetometer at a current timestamp by submitting the current measurement and the current timestamp to the probabilistic map; and
controlling an actuator of the vehicle based on a stochastic control employing the probability of the current location.

* * * * *